(12) United States Patent
Tan et al.

(10) Patent No.: US 10,300,601 B2
(45) Date of Patent: *May 28, 2019

(54) VEHICLE CONTROL SYSTEM WITH TASK MANAGER

(71) Applicant: General Electric Company, Schenectady, NY (US)

(72) Inventors: Huan Tan, Niskayuna, NY (US); John Michael Lizzi, Wilton, NY (US); Charles Burton Theurer, Alplaus, NY (US); Balajee Kannan, Niskayuna, NY (US); Romano Patrick, Atlanta, GA (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/114,318

(22) Filed: Aug. 28, 2018

(65) Prior Publication Data
US 2018/0361586 A1  Dec. 20, 2018

Related U.S. Application Data

(63) Continuation-in-part of application No. 15/198,673, filed on Jun. 30, 2016, now Pat. No. 10,065,317, and
(Continued)

(51) Int. Cl.
*B25J 9/16* (2006.01)
*B61G 7/04* (2006.01)

(52) U.S. Cl.
CPC ............... *B25J 9/1682* (2013.01); *B25J 9/16* (2013.01); *B25J 9/1666* (2013.01); *B61G 7/04* (2013.01)

(58) Field of Classification Search
CPC .......... B25J 9/16; B25J 9/1682; B25J 9/1666; B61G 7/04
See application file for complete search history.

(56) References Cited

U.S. PATENT DOCUMENTS

| 7,558,646 B2* | 7/2009 | Matsumoto | ............ B25J 9/1682 318/484 |
| 7,974,738 B2* | 7/2011 | Bruemmer | ........... G05D 1/0088 318/568.12 |

(Continued)

*Primary Examiner* — Rachid Bendidi
(74) *Attorney, Agent, or Firm* — Christopher R. Carroll; The Small Patent Law Group LLC

(57) ABSTRACT

A locomotive control system may include first and second robotic machines and a task manager. The first and second robotic machines have respective first and second sets of capabilities for interacting with a surrounding environment. The task manager selects the first and second robotic machines from a group to perform a task based on the first and second sets of capabilities of the robotic machines. The task involves manipulating and/or inspecting a target object of a vehicle. The task manager assigns a first sequence of sub-tasks to be performed by the first robotic machine and a second sequence of sub-tasks to be performed by the second robotic machine. The first and second robotic machines are configured to coordinate performance of the first sequence of sub-tasks by the first robotic machine with performance of the second sequence of sub-tasks by the second robotic machine to accomplish the task.

19 Claims, 7 Drawing Sheets

Related U.S. Application Data a continuation-in-part of application No. 15/399,313, filed on Jan. 5, 2017, and a continuation-in-part of application No. 15/183,850, filed on Jun. 16, 2016, now Pat. No. 10,105,844, and a continuation-in-part of application No. 15/872,582, filed on Jan. 16, 2018, and a continuation-in-part of application No. 15/809,515, filed on Nov. 10, 2017, and a continuation-in-part of application No. 15/804,767, filed on Nov. 6, 2017, and a continuation-in-part of application No. 15/585,502, filed on May 3, 2017, and a continuation-in-part of application No. 15/587,950, filed on May 5, 2017, and a continuation-in-part of application No. 15/473,384, filed on Mar. 29, 2017, and a continuation-in-part of application No. 14/541,370, filed on Nov. 14, 2014, now Pat. No. 10,110,795, and a continuation-in-part of application No. 15/584,995, filed on May 2, 2017, and a continuation-in-part of application No. 15/473,345, filed on Mar. 29, 2017, application No. 16/114,318, which is a continuation-in-part of application No. 15/058,494, filed on Mar. 2, 2016, now Pat. No. 10,093,022.

(60) Provisional application No. 62/343,615, filed on May 31, 2016, provisional application No. 62/336,332, filed on May 13, 2016, provisional application No. 62/269,523, filed on Dec. 18, 2015, provisional application No. 62/269,425, filed on Dec. 18, 2015, provisional application No. 62/269,377, filed on Dec. 18, 2015, provisional application No. 62/269,481, filed on Dec. 18, 2015.

(56) References Cited

U.S. PATENT DOCUMENTS

| | | | | |
|---|---|---|---|---|
| 8,583,313 | B2 * | 11/2013 | Mian | G05D 1/0229 700/245 |
| 9,026,248 | B1 * | 5/2015 | Hickman | B25J 3/00 700/246 |
| 9,799,198 | B2 * | 10/2017 | Tan | G08B 21/18 |
| 9,902,071 | B2 * | 2/2018 | Tan | B25J 9/1666 |
| 2014/0163730 | A1 * | 6/2014 | Mian | B25J 9/16 700/248 |
| 2015/0321350 | A1 * | 11/2015 | Mian | B25J 9/16 700/257 |
| 2016/0059416 | A1 * | 3/2016 | Tian | B25J 9/1666 700/253 |
| 2016/0354923 | A1 * | 12/2016 | Kuffner, Jr. | B25J 9/0084 |

* cited by examiner

VEHICLE CONTROL SYSTEM WITH TASK MANAGER

CROSS-REFERENCE TO RELATED APPLICATIONS

This application is a continuation-in-part of pending U.S. application Ser. No. 15/198,673, filed on Jun. 30, 2016; and is a continuation-in-part of pending U.S. application Ser. No. 15/399,313, filed on Jan. 5, 2017; and is a continuation-in-part of pending U.S. application Ser. No. 15/183,850, filed on Jun. 16, 2016; and is a continuation-in-part of pending U.S. application Ser. No. 15/872,582, filed on Jan. 16, 2018; and is a continuation-in-part of pending U.S. application Ser. No. 15/809,515, filed on Nov. 10, 2017; and is a continuation-in-part of pending U.S. application Ser. No. 15/804,767, filed on Nov. 6, 2017; and is a continuation-in-part of pending U.S. application Ser. No. 15/585,502, filed on May 3, 2017; and is a continuation-in-part of pending U.S. application Ser. No. 15/587,950, filed on May 5, 2017; and is a continuation-in-part of pending U.S. application Ser. No. 15/473,384, filed on Mar. 29, 2017; and is a continuation-in-part of pending U.S. application Ser. No. 14/541,370, filed on Nov. 14, 2014; and is a continuation-in-part of pending U.S. application Ser. No. 15/584,995, filed on May 2, 2017; and is a continuation-in-part of pending U.S. application Ser. No. 15/473,345, filed on Mar. 29, 2017, which claims priority to U.S. Provisional Application No. 62/343,615, filed on May 31, 2016 and to US Provisional Application No. 62/336,332, filed on May 13, 2016.

This application is also a continuation-in-part of U.S. application Ser. No. 15/058,494 filed on Mar. 2, 2016, which claims priority to U.S. Provisional Application Nos. 62/269,523, 62/269,425, 62/269,377, and 62/269,481, all of which were filed on Dec. 18, 2015.

All the applications above are herein incorporated by reference in their entireties, including the drawings, for all purposes.

BACKGROUND

Technical Field

The subject matter described herein relates to systems that control a plurality of robotic machines to perform vehicle tasks, such as actuating a brake lever on a vehicle to release air brakes of the vehicle.

Discussion of Art

Use of human operators may sometimes be relatively undesirable. But, automated systems may pose problems as well. It may be desirable to have a system that differs from those systems that are currently available.

BRIEF DESCRIPTION

In an embodiment, a system includes a first robotic machine having a first set of capabilities for interacting with a target object; a second robotic machine having a second set of capabilities for interacting with the target object; and a task manager having one or more processors and that can determine capability requirements to perform a task on the target object. The task has an associated series of sub-tasks, with the sub-tasks having one or more capability requirements. The task manager can assign a first sequence of sub-tasks to the first robotic machine for performance by the first robotic machine based at least in part on the first set of capabilities and a second sequence of sub-tasks to the second robotic machine for performance by the second robotic machine based at least in part on the second set of capabilities. The first and second robotic machines can coordinate performance of the first sequence of sub-tasks by the first robotic machine with performance of the second sequence of sub-tasks by the second robotic machine, and thereby to accomplish the task.

In an embodiment, a system includes a first robotic machine having a first set of capabilities for interacting with a surrounding environment and a second robotic machine having a second set of capabilities for interacting with the surrounding environment. The first robotic machine can receive a first sequence of sub-tasks related to the first set of capabilities of the first robotic machine. The second robotic machine can receive a second sequence of sub-tasks related to the second set of capabilities of the second robotic machine. The first and second robotic machines can perform the first and second sequences of sub-tasks, respectively, to accomplish a task that involves at least one of manipulating or inspecting a target object that is separate from the first and second robotic machines. The first and second robotic machines can coordinate performance of the first sequence of sub-tasks by the first robotic machine with performance of the second sequence of sub-tasks by the second robotic machine.

In an embodiment, a method is provided for a first robotic machine having a first set of capabilities for interacting with a surrounding environment, where the first robotic machine receives a first sequence of sub-tasks related to the first set of capabilities of the first robotic machine, and a second robotic machine having a second set of capabilities for interacting with the surrounding environment, where the second robotic machine receives a second sequence of sub-tasks related to the second set of capabilities of the second robotic machine. The method includes performing the first and second sequences of sub-tasks to accomplish a task comprising at least one of manipulating or inspecting a target object. Performance of the first sequence of sub-tasks by the first robotic machine is coordinated with performance of the second sequence of sub-tasks by the second robotic machine.

BRIEF DESCRIPTION OF THE DRAWINGS

The subject matter described herein may be understood from reading the following description of non-limiting embodiments, with reference to the attached drawings, wherein below.

DETAILED DESCRIPTION

Figure 1:
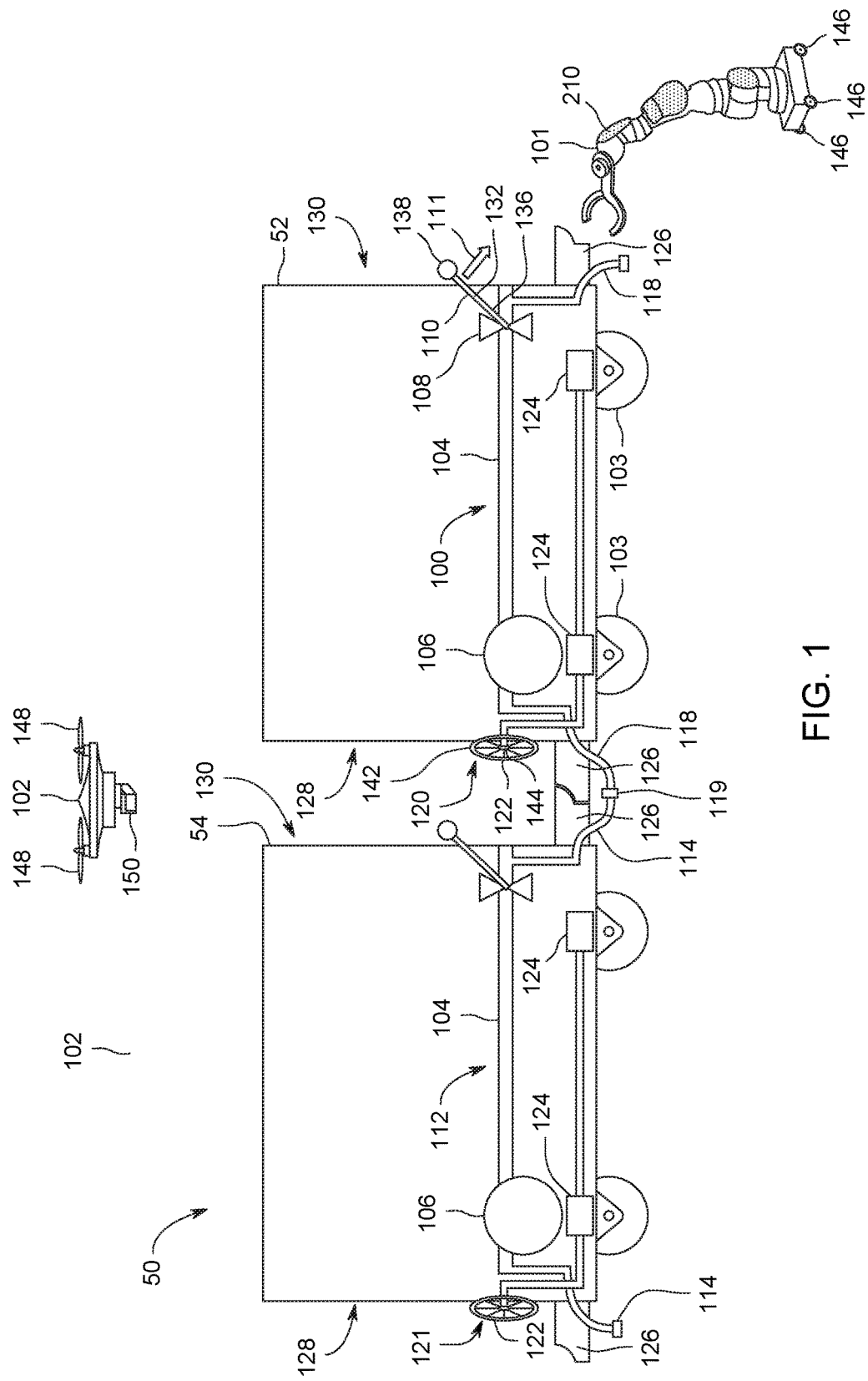
FIG. 1 schematically illustrates a vehicle system, a first robotic machine, and a second robotic machine according to one embodiment.

The systems described herein can be used to perform an assigned task on equipment using multiple robotic machines that collaborate to accomplish the assigned task.

In some examples the equipment or target object used to demonstrate aspects of this invention is a locomotive, other rail vehicle, or rail vehicle consist (group of rail vehicles), however the assigned tasks for the multiple automated robotic machines are not limited to the demonstration of such equipment. In one embodiment, the equipment may be better characterized as infrastructure. The nature of the equipment may require specific configuration of the inventive system, but each system may be selected to address application specific parameters. These selected features may include sensor packages, size and scale, implements, mobility platforms for one or more the multiple automated robotic machines, and the like. Further, the internal mechanisms of the robotic machines may be selected based on application specific parameters. Suitable mechanisms may be selected with regard to the range of torque, type of fuel or energy, environmental tolerances, and the like.

The assigned task may involve at least one of the robotic machine assemblies approaching, engaging, modifying, and manipulating (e.g., moving) a target object on the equipment. For example, a first robotic machine may perform at least a portion of the assigned task by grasping a lever and pulling a lever with a specific force (e.g., torque) in a specific direction and for a specific distance, before releasing the lever or returning the lever to a starting position. A second robotic machine may collaborate with the first robotic machine in the performance of the assigned task by at least one of inspecting a position of the brake lever on the equipment, carrying the first robotic machine to the equipment, lifting the first robotic machine toward the lever, verifying that the assigned task has been successfully completed, or the like. Thus, the multiple robotic machines work together to perform the assigned task. Each robotic machine performs at least one sub-task, and the assigned task may be completed upon the robotic machines completing the sub-tasks. In order to collaborate successfully, the robotic machines may communicate directly with each other.

The robotic machines may perform the same or similar tasks on multiple items of equipment in a larger equipment system. The robotic machines may perform the same or similar tasks on different types of the equipment and/or on different the equipment systems. Although two robotic machines may be described in the example above, more than two robotic machines may collaborate with each other to perform an assigned task in another embodiment. For example, one robotic machine may fly along the equipment to inspect a position of a lever or valve, a second robotic machine may lift a third robotic machine to the lever, and the third robotic machine may grasp and manipulate the lever to change the lever position. In one use case, an example of an assigned task may be to release air from a hydraulic or a compressed air system on the equipment. If the compressed air system is a vehicle air brake system, the task may be referred to herein as brake bleeding.

In one or more embodiments, multiple robotic machines may be controlled to work together (e.g., collaborate) to perform different tasks to the equipment. The robotic machines may be automated, such that the tasks may be performed autonomously without direct, immediate control of the robotic machines by a human operator as the robotic machines operate. The multiple robotic machines that collaborate with each other to perform an assigned task may be not identical (e.g., like copies). The robotic machines have different capabilities or affordances relative to each other. The robotic machines may be controlled to collaborate with each other to perform a given assigned task because the task cannot be completed by one of the robotic machines acting alone and/or the task can be completed by one of the robotic machines acting alone but not in a timely or cost-effective manner relative to multiple robotic machines acting together to accomplish the assigned task. For example, in a rail yard, some tasks include brake bleeding, actuating (e.g., setting or releasing) hand brakes on two adjacent rail vehicles, connecting air hoses between the two adjacent rail vehicles (referred to herein as hose lacing), and the like.

In one embodiment a system includes a first robotic machine having a first set of capabilities for interacting with a target object. A second robotic machine has a second set of capabilities for interacting with the target object. A task manager has one or more processors and can determine capability requirements to perform a task on the target object. The task has an associated series of sub-tasks having one or more capability requirements. The task manager may assign a first sequence of sub-tasks to the first robotic machine for performance by the first robotic machine based at least in part on the first set of capabilities and a second sequence of sub-tasks to the second robotic machine for performance by the second robotic machine based at least in part on the second set of capabilities. The first and second robotic machines may coordinate performance of the first sequence of sub-tasks by the first robotic machine with performance of the second sequence of sub-tasks by the second robotic machine to accomplish the task.

Suitable first and second sets of capabilities of the first and second robotic machines may include least one of flying, driving, diving, lifting, imaging, grasping, rotating, tilting, extending, retracting, pushing, and/or pulling. Suitable capabilities of the second set of the second robotic machine may include at least one capability that differs from the first set of capabilities of the first robotic machine. (For example, one or more of the second set of capabilities of the second robotic machine may be capabilities that the first robotic machine lacks, and/or one or more of the first set of capabilities of the first robotic machine may be capabilities that the second robotic machine lacks.)

During operation, the first and second robotic machines may coordinate performance of the first sequence of sub-tasks by the first robotic machine with the performance of the second sequence of sub-tasks by the second robotic machine by communicating directly with each other. The first robotic machine may notify the second robotic machine, directly or indirectly, that the corresponding sub-task is completed and the second robotic machine responds to the notification by completing a corresponding sub-task in the second sequence. The first robotic machine may provide to the second robotic machine, directly or indirectly, a sensor signal having information about the target object, and the task manager makes a decision whether the second robotic machine proceeds with a sub-task of the second sequence based at least in part on the sensor signal. At least some of the sub-tasks may be sequential such that the second robotic machine begins performance of a dependent sub-task in the second sequence responsive to receiving a notification from the first robotic machine that the first robotic machine has completed a specific sub-task in the first sequence. The first robotic machine may perform at least one of the sub-tasks in the first sequence concurrently with performance of at least one of the sub-tasks in the second sequence by the second robotic machine.

The task manager may access a database that stores capability descriptions corresponding to each of plural robotic machines in a group of robotic machines. (For example, the group of robotic machines may comprise robotic machines that are available for selective use in a given facility or other location.) The task manager may select from the group the first and second robotic machines appropriate to perform the task instead of other robotic machines in the group based on a suitability of the capability descriptions of the first and second robotic machines to the task or corresponding sub-task.

In one example, the first robotic machine performs one or more of the first sequence of sub-tasks by coupling to and lifting the second robotic machine from a starting location to a lifted location such that the second robotic machine in the lifted location is positioned relative to the target object to complete one or more of the second sequence of sub-tasks than when the second robotic machine is in the starting location. (For example, it may be the case that the second robotic machine cannot complete the one or more of the second sequence of the sub-tasks when in the starting location.) In another embodiment, the first robotic machine performs the first sequence of sub-tasks by flying, and the first robotic machine identifies the target object and determines at least two of a position of the target object, a position of the first robotic machine, and/or a position of the second robotic machine. The second robotic machine performs the second sequence of sub-tasks by one or more of modifying the target object, manipulating the target object, observing the target object, interacting with the target object, and/or releasing the target object.

The first robotic machine, having been assigned a sequence of sub-tasks by the task manager, may determine to travel a determined path from a first location to a second location of the first robotic machine, and then signals to the second robotic machine, to the task manager, or both the second robotic machine and the task manager information including the determined path, the act of using the capability, or both. Additionally or alternatively, the first robotic machine may determine to act using a capability of the first set of capabilities, or both determines to travel the intended path and determines to act using the capability.

In one embodiment, the second robotic machine, responsive to the signal from the first robotic machine, initiates a confirmatory receipt signal back to the first robotic machine. This may act as a "ready" signal to initiate a sub-task. Suitable sub-tasks may include moving the robotic machine, moving an implement of the robotic machine, transferring information or data, evaluating a sensor signal, and the like.

The first robotic machine and the second robotic machine each may generate one or more of time indexing signals associated with one or both of the first sequence of sub-tasks and/or the second sequence of sub-tasks, position indexing signals for locations of one or both of the first robotic machine and/or the second robotic machine, and/or orientation indexing signals for one or more tools to implement one or both of the first set of capabilities of the first robotic machine and the second set of capabilities of the second robotic machine.

At least one of the first robotic machine and/or the second robotic machine may have a plurality of moving operational modes. In one embodiment, the machine may have a first mode of operation that is a gross movement mode and a second mode of operation that is a fine movement mode. Suitable robotic machines may include one or more of one or more of a stabilizer, an outrigger, or a clamp. In one embodiment, suitable modes may include a transition in operation from the first mode to the second mode that includes deploying and setting the stabilizer, outrigger, or clamp. In another embodiment, there may be a fast-close operation that moves one or more robotic machines proximate to the target object quickly, followed by a transition to a slower movement mode that carefully moves the robotic machine from proximate the target object to contact with the target object. (A slow speed is a speed that is slower than a fast speed, which is a speed that is faster than the slow speed; i.e., they are slower or faster relative to one another.) The first mode of operation may include moving at least one of the first robotic machine and the second robotic machine to determined locations proximate to the target object and to each other; and the second mode of operation may include actuating one or more tools of at least one of the first robotic machine and the second robotic machine to accomplish the task.

In one embodiment, a first robotic machine has a first set of capabilities for interacting with a surrounding environment, where the first robotic machine may receive a first sequence of sub-tasks related to the first set of capabilities of the first robotic machine; and a second robotic machine has a second set of capabilities for interacting with the surrounding environment. The second robotic machine may receive a second sequence of sub-tasks related to the second set of capabilities of the second robotic machine. The first and second robotic machines may perform the first and second sequences of sub-tasks, respectively, to accomplish a task that involves at least one of manipulating or inspecting a target object that is separate from the first and second robotic machines. The first and second robotic machines may coordinate performance of the first sequence of sub-tasks by the first robotic machine with performance of the second sequence of sub-tasks by the second robotic machine.

At least some of the sub-tasks may be sequential such that the second robotic machine may begin performance of a corresponding sub-task in the second sequence responsive to receiving a notification from the first robotic machine that the first robotic machine has completed a specific sub-task in the first sequence.

During operation, the system may include the first robotic machine having a first set of capabilities for interacting with a surrounding environment, the first robotic machine configured to receive a first sequence of sub-tasks related to the first set of capabilities of the first robotic machine, and a second robotic machine having a second set of capabilities for interacting with the surrounding environment, the second robotic machine configured to receive a second sequence of sub-tasks related to the second set of capabilities of the second robotic machine. The system may perform the first and second sequences of sub-tasks to accomplish a task comprising at least one of manipulating or inspecting a target object, and may coordinate performance of the first sequence of sub-tasks by the first robotic machine with performance of the second sequence of sub-tasks by the second robotic machine.

FIG. 1 schematically illustrates an equipment system 50, a first robotic machine 101, and a second robotic machine 102 according to one embodiment. The equipment system may include first equipment 52 and second equipment 54 that may be mechanically interconnected to travel together along a route. The second equipment may be disposed in front of the first equipment in a direction of movement of the equipment system. In an alternative embodiment, the equipment system may include more than two interconnected pieces or items of equipment or only one item of equipment. The first and second equipment are rail vehicles in the illustrated embodiment. In other embodiments, suitable mobile equipment may include automobiles, off-road equipment, or the like. In other embodiments, suitable stationary equipment may include railroad tracks, roads, bridges, buildings, stacks, stationary machines, and the like. The first and second robotic machines may perform an assigned task on the equipment. The first and second robotic machines collaborate (e.g., work together) to accomplish the assigned task. The first and second robotic machines perform various sub-tasks semi-autonomously, autonomously (without direct control and/or supervision of a human operator), or manually under remote control of an operator. For example, the robotic machines may act based on instructions received prior to beginning the sub-tasks. The assigned task may be completed upon the completion of the sub-tasks by the robotic machines. Whether the task is manual, semi-auto, or autonomous is based in part on the sub-task, the capabilities of the robotic machines, the target object, and the like. Further, inspection of a target object may determine whether the sub-task should be performed in a manual, semi-auto, or autonomous manner.

In the illustrated embodiment, the first equipment has an air brake system 100 disposed onboard. The air brake system engages corresponding wheels 103 and may operate on a pressure differential within one or more conduits 104 of the air brake system. When the pressure of a fluid, such as air, in the conduits is above a designated threshold or when the pressure increases by at least a designated amount, air brakes 106 engage corresponding wheels of the first equipment. (In certain equipment, such as certain rail vehicles, the air brakes may be configured to engage when the pressure of the fluid (e.g., air) in the conduits drops below a designated threshold.) Although only one air brake is shown in FIG. 1, the air brake system may include several air brakes. The conduit connects with a valve 108 that closes to retain the fluid (and fluid pressure) within the conduit. The valve can be opened to release (e.g., bleed) the fluid out of the conduit and the air brake system. (As noted, in certain equipment, once the pressure of the fluid in the conduit and air brake system drops by or below a designated amount, the air brake engages the wheels.) The first equipment may freely roll while the air brake is disengaged, but is held fast while the air brake is engaged.

The valve can be actuated by manipulating (e.g., moving) a brake lever 110. The brake lever can be pulled or pushed in a direction 111 to open and close the valve. The brake lever is an example of a target object. In an embodiment, releasing the brake lever may cause the valve to close. For example, the brake lever may move under the force of a spring or other biasing device to return to a starting position and force the valve closed. In another embodiment, the brake lever may require an operator or an automated system to return the brake lever to the starting position to close the valve after bleeding the air brake system.

The second equipment may include its own air brake system 112 that may be identical, or at least substantially similar, to the air brake system of the first equipment. The second equipment may include a first hose 114 (referred to herein as an air hose) that may fluidly connect to the conduit of the air brake system. The first equipment may include a second hose 118 that may be fluidly connected to the same conduit. The second hose extends from a front 128 of the first equipment, and the first hose extends from a rear 130 of the second equipment. The hoses may connect to each other at a separable interface 119 to provide a fluid path between the air brake system of the first equipment and the air brake system of the second equipment. Fluid may be allowed to flow between the air brake systems when the hoses may be connected. Fluid cannot flow between the air brake systems when the hoses are disconnected. The first equipment has another second air hose at the rear end 130 thereof, and the second equipment has another first air hose at the front end thereof.

The first equipment may include a hand brake system 120 disposed onboard the first equipment. The hand brake system may include a brake wheel 122 that may be rotated manually by an operator or an automated machine. The brake wheel is mechanically linked to friction-based hand brakes 124 (e.g., shoes or pads) on the first equipment. Rotation of the brake wheel in a first direction causes the hand brakes to move towards and engage the wheels, setting the hand brakes. Rotation of the brake wheel in an opposite, second direction causes the hand brakes to move away from and disengage the wheels, releasing the hand brakes. In an alternative embodiment, the hand brake system may include a lever or another actuatable device instead of the brake wheel. In the illustrated embodiment, the second equipment may include a hand brake system 121 that may be identical, or at least substantially similar, to the hand brake system of the first equipment.

The first and second equipment may include mechanical couplers at both the front ends and the rear ends of the equipment. The mechanical coupler at the rear end of the second equipment mechanically engages and connect to the mechanical coupler at the front end of the first equipment to interconnect or couple the equipment to each other. The first equipment may be uncoupled from the second equipment by disconnecting the mechanical couplers 126 that extend between the first and second equipment.

The robotic machines may be discrete from the equipment system such that neither robotic machine is integrally connected to the equipment system. The robotic machines may move relative to the equipment system to interact with at least one of the first and/or second equipment. Each of the robotic machines has a specific set of affordances or capabilities for interacting with the surrounding environment. Some examples of capabilities include flying, driving (or otherwise traversing along the ground), lifting other objects, imaging (e.g., generating images and/or videos of the surrounding environment), grasping an object, rotating, tilting, extending (or telescoping), retracting, pushing, pulling, or the like. The first robotic machine has a first set of capabilities, and the second robotic machine has a second set of capabilities.

In the illustrated embodiment, the first robotic machine may be different than the second robotic machine, and has at least some different capabilities than the first robotic machine. Thus, the second set of capabilities of the second robotic machine may include at least one capability that differs from the first set of capabilities of the first robotic machine or vice-versa. For example, the first robotic machine in the illustrated embodiment has the capability to drive on the ground via the use of multiple wheels 146. The first robotic machine also has the capabilities to grasp and manipulate a target object 132 on a designated the equipment, such as the first equipment, using a robotic arm 210. The robotic arm may have the capabilities to rotate, tilt, lift, extend, retract, push, and/or pull the target object 132. The first robotic machine may be referred to herein as a grasping robotic machine. In the illustrated embodiment, the target object 132 may be identified as the brake lever, but the target object 132 may be a different device on the first equipment depending on the assigned task that may be performed by the robotic machines.

The second robotic machine in the illustrated embodiment is an aerial robotic machine (e.g., a drone) that has the capability to fly in the air above and/or along a side of the equipment system via the use of one or more propellers 148. Although not shown, the robotic machine may include wings that provide lift. The second robotic machine in FIG. 1 may be referred to as an aerial robotic machine. The aerial robotic machine may include an imaging device 150 that may be configured to generate imaging data. Imaging data may include still images and/or video of the surrounding environment in the visual frequency range, the infrared frequency range, or the like. Suitable imaging devices may include an infrared camera, a stereoscopic 2D or 3D camera, a digital video camera, or the like. Using the imaging device, the aerial robotic machine has the capability to visually inspect designated equipment, including a target object thereof, such as to determine a position or status of the target object. The aerial robotic machine may not have the capability to drive on the ground or grasp and manipulate a target object like a grounded grasping robotic machine. The grounded robotic machine, on the other hand, may not have the capability to fly.

The robotic machines may perform an assigned task on one or both of the first and/or second equipment. For example, the robotic machines may perform the assigned task on the first equipment, and then may subsequently perform an assigned task on the second equipment. The equipment system may include more than just the two items of equipment shown in FIG. 1. The robotic machines may move along the equipment system from one location or region of interest to another, and may designate new equipment and new target objects on which to perform assigned tasks. Alternatively, the robotic machines may perform the assigned task on the first equipment and not on the second equipment, or vice-versa. The grasping and aerial robotic machines work together and collaborate to complete the assigned task. The assigned task involves at least one of the robotic machines engaging and manipulating the target object 132 on the designated equipment. In the illustrated embodiment, the grasping robotic machine may engage and manipulate the brake lever which defines the target object. The aerial robotic machine may fly above the equipment system and inspect the target object using the imaging device. The aerial robotic machine also may use the imaging device to detect the presence of obstructions between the grasping robotic machine and the target object. As discussed further herein, in one embodiment the imaging device may be used to help locate and navigate the aerial robotic machine.

The aerial robotic machine and the grasping robotic machine shown in FIG. 1 are intended as examples. The first and second robotic machines may have other shapes and/or capabilities or affordances in other embodiments, as shown and described herein. For example, the robotic machines in one or more other embodiments may both be land-based and/or may both have robotic arms 210 for grasping.

One assigned task may be for the robotic machines to bleed the air brake systems of the respective equipment in the equipment system. Prior to the equipment system starting to move from a stationary position, the air brake systems of each of the first and second equipment must be manipulated to release the air brake. The brake lever is identified as the target object. The grasping and aerial robotic machines collaborate to perform the assigned task. For example, the aerial robotic machine may fly above the first equipment, locating and identifying the brake lever, and determining that the brake lever is in a non-actuated position requiring manipulation to release the air brake. The aerial robotic machine informs the grasping robotic machine of the location and/or status (e.g., non-actuated) of the target object and, optionally, the distance and orientation of the second robotic machine, or the arm of the second robotic machine relative to the target object. Since the grasping robotic machine traverses on the ground, the robotic machine may be susceptible to obstructions blocking its path. The aerial robotic machine optionally may inspect the path ahead of the ground robotic machine and notify the ground robotic machine of any detected obstacles between it and the target object (e.g., brake lever). The grasping robotic machine receives and processes the information transmitted from the aerial robotic machine. The grasping robotic machine moves toward the brake lever, engages the brake lever, and manipulates the brake lever by pulling or pushing the brake lever. The grasping robotic machine and/or the aerial robotic machine determine whether the brake lever has been moved fully to the actuated position. Upon confirmation that the air brake is released, the grasping robotic machine releases the brake lever. It may then move to the next item of equipment (e.g., the second equipment) in the equipment system to repeat the brake bleeding task. Optionally, the robotic machines may implement one or more follow up actions responsive to determining that the air brake system has or has not been released, such as by communicating with one or more human operators, attempting to release the air brake system again, or identifying the first equipment having the air brake system that may be not released as requiring inspection, maintenance, or repair. As discussed herein, at least one of the robotic machines may confirm completion of the sub-task using an acoustic sensor.

The robotic machines may perform additional or different tasks other than brake bleeding. For example, the robotic machines may be assigned the task of setting and/or releasing the hand brakes of one or both of the first equipment and second equipment. The hand brakes may be set as a back-up to the air brake. When the equipment system stops, human operators may decide to set the hand brakes on only some of the equipment, such as the hand brakes on every fourth item of equipment along the length of the equipment system. One assigned task may be to release the hand brakes on the equipment to allow the equipment system to move along the route. In an embodiment, the aerial robotic machine may fly along the equipment system to detect which of the various equipment has hand brakes that need to be released, if any. The aerial robotic machine may inspect the hand brakes along the equipment and/or the positions of the brake wheels to determine which equipment needs to have the hand brakes released. For example, the aerial robotic machine may determine that the hand brake of the second equipment needs to be released, but the hand brake of the first equipment is not set. The aerial robotic machine notifies the grasping robotic machine to actuate the brake wheel of the second equipment, but not the brake wheel of the first equipment. The aerial robotic machine may provide other information to the grasping robotic machine, such as distance from the grasping robotic machine to the target object, the type and location of obstacles detected in the path of the grasping robotic machine, and the configuration of the target object itself (not all items of equipment may be identical).

Upon receiving the communication from the aerial robotic machine, the grasping robotic machine may move past the first equipment to the front end of the second equipment. The grasping robotic machine manipulates the brake wheel, which represents the target object, by extending the robotic arm to the brake wheel, grasping the brake wheel, and then rotating the brake wheel in a designated direction to release the hand brakes. After one or both robotic machines confirm that the hand brakes of the second equipment are released, the assigned task is designated as complete. The robotic machines may move to other the equipment (not shown) in the equipment system to perform an assigned task on other equipment.

In another embodiment, the robotic machines may be assigned the task of coupling or uncoupling the first equipment relative to the second equipment. The robotic machines may both be land-based (instead of the aerial machine shown in FIG. 1) and may perform the task by engaging and manipulating the mechanical couplers of the equipment which represent target objects. For example, the first robotic machine may engage the coupler at the front of the first equipment, and the second robotic machine may engage the coupler at the rear of the second equipment. The robotic machines collaborate during the performance of the assigned task in order to couple or uncouple the first equipment relative to each other.

Yet another potential assigned task that may be assigned to the robotic machines may be hose lacing. Hose lacing involves connecting (or disconnecting) air hoses of the first equipment to each other to fluidly connect the air brake systems to itself. This closes an otherwise open fluidic circuit. For example, both robotic machines may have robotic arms like the robotic arm of the grasping robotic machine shown in FIG. 1. The first robotic machine may grasp an end of the second hose at the front end of the first equipment, and the second robotic machine grasps an end of the first hose at the rear end of the second equipment. The robotic machines communicate and collaborate to index and align (e.g., tilt, rotate, translate, or the like) the hoses of the two the first equipment with each other and then move the hoses relative to each other to connect the hoses at the separable interface.

Although potential tasks for the robotic machines to perform on the equipment may be described with reference to FIG. 1, the robotic machines may perform various other tasks on other equipment systems that involve manipulating and/or inspecting a target object.

Figure 2:
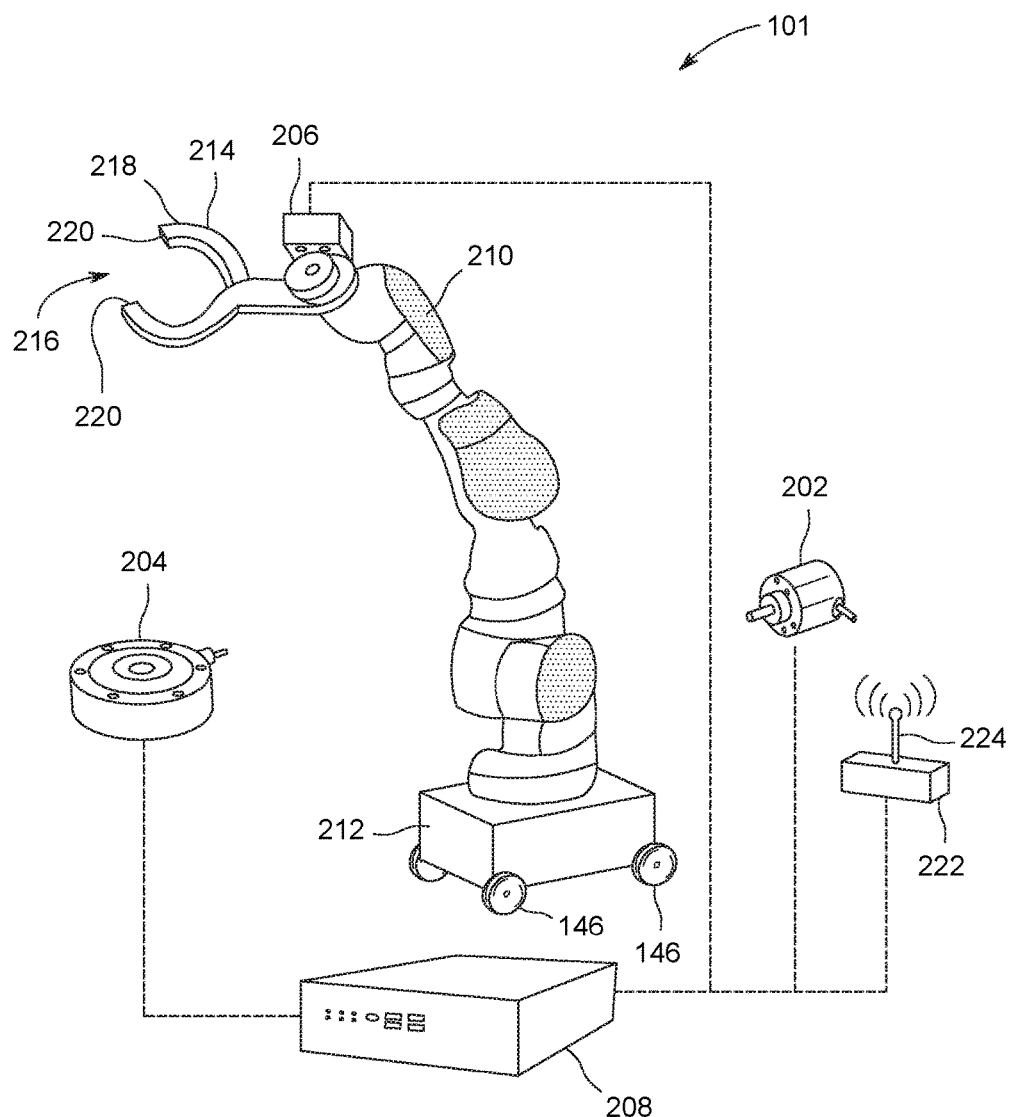
FIG. 2 illustrates one embodiment of the first robotic machine shown in FIG. 1.

FIG. 2 illustrates an embodiment of the first robotic machine shown in FIG. 1. The grasping robotic machine is shown in a partially exploded view with several components (e.g., 202, 204, 208, and 222) displayed spaced apart from the robotic arm. The robotic arm may be mounted on a mobile base 212 that includes wheels. The mobile base moves the robotic arm towards the target object of the equipment and transports the arm from place to place. The robotic arm may move in multiple different directions and planes relative to the base under the control of a task manager via a controller 208. The controller drives the robotic arm to move toward the corresponding target object (e.g., the brake lever shown in FIG. 1) to engage the target object and manipulate the target object to perform the assigned task. For example, the controller may convey commands in the form of electrical signals to actuators, motors, and/or other devices of the robotic arm that provide a kinematic response to the received commands.

The controller represents hardware circuitry that may include, represent, and/or may be connected with one or more processors (e.g., microprocessors, field programmable gate arrays, integrated circuits, or other electronic logic-based devices). The controller may include and/or be communicatively connected with one or more digital memories, such as computer hard drives, computer servers, removable hard drives, etc. The controller may be communicatively coupled with the robotic arm and the mobile base by one or more wired and/or wireless connections that allow the controller to dictate how and where the grasping robotic machine moves. Although shown as a separate device that may be not attached to the robotic arm or the mobile base, the controller may be mounted on the robotic arm and/or the mobile base.

The robotic arm may include an end effector 214 at a distal end 216 of the robotic arm relative to the mobile base. The end effector may directly engage the target object on the equipment to manipulate the target object. For example, the end effector may grasp the brake lever (shown in FIG. 1) to hold the lever such that subsequent movement of the robotic arm moves the brake lever with the arm. In the illustrated embodiment, the end effector has a claw 218 that may be controllable to adjust a width of the claw to engage and at least partially enclose the target object. The claw has two fingers 220 that may be movable relative to each other. For example, at least one of the fingers may be movable relative to the other finger to adjust the width of the claw and allow the claw to grasp the target object. The end effector may have other shapes in other embodiments.

The grasping robotic machine may include a communication circuit 222. The communication circuit operably connects to the controller. Suitable circuits may include hardware and/or software that may be used to communicate with other devices and/or systems, such as another robotic machine (e.g., the second robotic machine shown in FIG. 1) configured to collaborate with the robotic machine to perform the assigned task, remote servers, computers, satellites, and the like. The communication circuit may include a transceiver and associated circuitry (e.g., an antenna 224) for wireless bi-directional communication of various types of messages, such as task command messages, notification messages, reply messages, feedback messages, or the like. The communication circuit may transmit messages to specific designated receivers and/or broadcast messages indiscriminately. In an embodiment, the communication circuit may receive and convey messages to the controller prior to and/or during the performance of an assigned task. As described in more detail herein, the information received by the communication circuit from remote sources, such as another robotic machine collaborating with the robotic machine, may be used by the controller to control the timing and movement of the robotic arm during the performance of the assigned task. Although the communication circuit is illustrated as a box-shaped device that may be separate from the robotic arm and the mobile base, the communication circuit may be mounted on the robotic arm and/or the mobile base.

The grasping robotic machine may include one or more sensors 202, 204, 206 that monitor operational parameters of the grasping robotic machine and/or the target object that the robotic machine manipulates. The operational parameters may be communicated from the respective sensors to the controller. The controller examines the parameters to make determinations regarding the control of the robotic arm, the mobile base, and the communication circuit. In the illustrated example, the robotic machine may include an encoder sensor that converts rotary and/or linear positions of the robotic arm into one or more electronic signals. The encoder sensor can include one or more transducers that generate the electronic signals as the arm moves. The electronic signals can represent displacement and/or movement of the arm, such as a position, velocity, and/or acceleration of the arm at a given time. The position of the arm may refer to a displaced position of the arm relative to a reference or starting position of the arm, and the displacement may indicate how far the arm has moved from the starting position. Although shown separated from the robotic arm and mobile base in FIG. 2, the encoder sensor may be mounted on the robotic arm and/or the mobile base in an embodiment.

The grasping robotic machine may also include an imaging sensor 206 that may be installed on the robotic arm. In an embodiment, the imaging sensor may be mounted on or at least proximate to the end effector. For example, the imaging sensor may include a field of view that encompasses at least a portion of the end effector. The imaging sensor moves with the robotic arm as the robotic arm moves toward the brake lever. The imaging sensor acquires perception information of a working environment of the robotic arm. The perception information may include images and/or video of the target object in the working environment. The perception information may be conveyed to the controller as electronic signals. The controller may use the perception information to identify and locate the target object relative to the robotic arm during the performance of the assigned task. Optionally, the perception information may be three-dimensional data used for mapping and/or modeling the working environment. For example, the imaging sensor may include an infrared (IR) emitter that generates and emits a pattern of IR light into the environment, and a depth camera that analyzes the pattern of IR light to interpret perceived distortions in the pattern. The imaging sensor may also include one or more color cameras that operate in the visual wavelengths. The imaging sensor may acquire the perception information at an acquisition rate of at least 15 Hz, such as approximately 30 Hz. Optionally, the imaging sensor may be a Kinect™ sensor manufactured by Microsoft.

Suitable imaging sensors may include video camera units for capturing and communicating video data. Suitable images may be in the form of still shots, analog video signals, or digital video signals. The signals, particularly the digital video signals, may be subject to compression/decompression algorithms, such as MPEG or HEVC. A suitable camera may capture and record in a determined band of wavelengths of light or energy. For example, in one embodiment the camera may sense wavelengths in the visible spectrum and, in another, the camera may sense wavelengths in the infrared spectrum. Multiple sensors may be combined in a single camera and may be used selectively based on the application. Further, stereoscopic and 3D cameras are contemplated for at least some embodiments described herein. These cameras may assist in determining distance, velocity, and vectors to predict (and thereby avoid) collision and damage. For example, the camera may be deployed onboard a robotic machine to capture video data, for storage for later use. The robotic machine may act as a powered camera supporting object, such that the camera may be mobile. That is, the camera unit and its supporting object may be capable of moving independent or separate from movement of an operator or another robotic machine. The supporting object may be a robotic machine, or an implement of the robotic machine. Suitable implements may include an extendable mast.

The camera unit may be connected or otherwise disposed onboard an aerial robotic machine (e.g., a drone, helicopter, or airplane) to allow the camera unit to fly, or the camera unit may be connected with or otherwise disposed onboard another ground-based or aquatic robotic machine to allow the robot and camera relative movement. In one embodiment, the camera supporting object is the first robotic machine capable of at least one of remote control or autonomous movement relative to the second robotic machine. The first robotic machine may travel along a route ahead of the second robotic machine and may transmit the image data back to the second robotic machine. This may provide an operator of the second robotic machine a view of the route well in advance of the arrival of the second robotic machine. For very high speed second robotic machines, the stopping distance may be beyond the visibility provided from the vantage of the second robotic machine. The view from the first vehicle, then, may extend or supplement that visible range. In addition, the camera itself may be repositionable and may have the ability to pan left, right, up and down, as well as the ability to zoom in and out.

The camera unit or the supporting robotic machine can include a locator device that generates data used to determine its location. The locator device can represent one or more hardware circuits or circuitry that include and/or are connected with one or more processors (e.g., controllers, microprocessors, or other electronic logic-based devices). In one example, the locator device represents a global positioning system (GPS) receiver that determines a location of the camera unit, a beacon or other communication device that broadcasts or transmits a signal that is received by another component (e.g., the transportation system receiver) to determine how far the camera unit is from the component that receives the signal (e.g., the receiver), a radio frequency identification (RFID) tag or reader that emits and/or receives electromagnetic radiation to determine how far the camera unit is from another RFID reader or tag (e.g., the receiver), or the like. The receiver can receive signals from the locator device to determine the location of the locator device relative to the receiver and/or another location (e.g., relative to a vehicle or vehicle system). Additionally or alternatively, the locator device can receive signals from the receiver (e.g., which may include a transceiver capable of transmitting and/or broadcasting signals) to determine the location of the locator device relative to the receiver and/or another location (e.g., relative to a vehicle or vehicle system).

The robotic machine may include a force sensor 204 that monitors forces applied by the robotic arm on the target object during the performance of the assigned task as the robotic arm manipulates the target object. As used herein, the term "force" encompasses torque, such that the forces applied by the robotic arm on the target object described herein may or may not result in the target object twisting or rotating. The force sensor may communicate electronic signals to the controller that represent the forces exerted by the robotic arm on the target object, as monitored by the force sensor. The forces may represent forces applied by the claw of the end effector on the target object. The sensed forces may represent those forces applied on various joints of the robotic arm for moving and maneuvering the arm.

Optionally, the robotic machine may include one or more other sensors in addition to, or instead of one or more of, the sensors shown in FIG. 2. For example, the robotic machine may include an acoustic sensor that detects sounds generated during actuation of the brake lever (shown in FIG. 1) to determine whether the brake lever has been actuated to release the air brake system. The acoustic sensor may detect contact between implements of one robotic machine and one or more of another robotic machine, an implement of another robotic machine, another implement of the first robotic machine, a portion of the target object, or another object that is neither a robotic machine (or its implements) or the target object. Feedback from the acoustic sensor may be used to calibrate an implement's location and/or speed and/or force. For example, the sensing function may correlate a contact sound to indicate when a grip has been moved far enough to contact the target object. At that moment, the task manager may index the robotic machine's implement (or the robotic machine's location) relative to the target object or another object. The task manager may base task instruction on such index information. If the sub-task commanded an implement to contact an object, that sub-task may be considered to be fulfilled so that the sequentially next sub-task may start. The magnitude of the acoustic signal may correlate to the force of impact of the implement with the target object. Adjustments to movement speed and movement force may be made based at least in part on the signal magnitude. An operating mode may be initiated if the task manager is unsure of location of an implement or robotic machine to intentionally make contact to generate an acoustic signal, and therefore ascertain relative locations or verify locations.

The robotic machine may include one or more other sensors that may function similarly to the uses set forth for the acoustic sensor, as modified by the application and the sensor type. Suitable sensors may monitor the speed of the mobile robotic machine and/or the speed at which an implement, such as a robotic arm, moves relative to the robotic machine base. In one embodiment, at least one robotic machine may define a plurality of zones of movement for an implement. Such zones may be designated in such a way that the task manager, or the robotic machine, may behave differently based on triggers or activities associated with one of the zones that differs from behavior in other zones. In one example, a zone may be a potential contact zone insofar as an implement of a robotic machine may be operating in such potential contact zone and that if there is an object, such as a target object or an obstacle, in such potential contact zone the implement may impact or act on that object. The task manager may be apprised of, via one or more sensors, the presence or absence of such an object in such a zone.

In one embodiment, differences in acoustic signals are modeled and associated with various types of activities. A human voice that is sensed may indicate the presence of a human within a potential contact zone. As such, the task manager may preclude some sub-tasks, such as movement of the robotic machine or its implement, until verification can be made that no human is located in the potential contact zone. Verification might be made by a manual indication that all persons have vacated such potential contact zone. Or, a second set of sensors may confirm that, for example, a signaling tag worn by a person is not present in such potential contact zone prior to allowing movement of an implement in such potential contact zone. Alternatively, a lock out system may be employed such that if a lock out tag, or equivalent, is set for a particular zone the robotic machine may not move or may not move an implement into or through such potential contact zone until a corresponding lock out tag is removed.

Movement in other zones may be allowed even while other zones have one or more tasks and activities constrained. In one embodiment, if a robotic machine has four lateral zones defined as forward, rearward, left and right and an obstacle or equivalent (such as a lock out tag, or a detected human (via voice or image)) is sensed in the forward zone, the robotic machine may move itself and/or an implement into one of the three remaining zones while avoiding movement or activity in the forward zone.

In one embodiment, the task includes an inspection plan including the virtual 3D travel path of and/or about an asset. In a first operating mode, one or more robotic machine may travel to a location proximate to the target object in the real world based on, for example, global positioning system (GPS) coordinates of the asset in comparison to GPS coordinates of the robot and, on arrival, align or index to a virtually created 3D model. In a second travel mode, the robotic machine may travel and align with the target object based on sensor input (other than GPS) relative to the 3D model. That is, once a robotic machine has arrived at a desired start location the robotic machine may move along the real travel path from the start location to an end location in an autonomous or semi-autonomous fashion based at least in part on the 3D model and environmental sensors. This may be useful where the target object is very large, e.g., a section of road, a railway, a bridge, or a building. Specific areas of interest about the target object may be monitored and evaluated dynamically by the robotic machine.

During travel, the robotic machine may stop, pause, slow down, speed-up, maintain speed, etc., capture images, as well as sense for other data (e.g., temperature, humidity, pressure, etc.) at various regions of interest (ROI) designated by the task manager. For each ROI, the virtual 3D model may include three-dimensional coordinates (e.g., X, Y, and Z axis coordinates) at which the robotic machine is to be located for performing a particular sub-task. In addition to a location in three dimensional space, each ROI may include a perspective with respect to a surface of the target object at which the sub-task may dictate the capture of data or images, field of view of a camera, orientation, and the like. To execute sub-tasks, the robotic machine may use multiple models. Suitable models may include a model of the world for safe autonomous navigation to and from a work site, and another model of the target object which contains the location of regions of interest. Based on the model of the world the task manager may determine how to orient the first robotic machine or the second robotic machine relative to each other, the target object, and/or the surrounding environment. Based on the model of the asset, each robotic machine can execute sub-tasks at regions of interest. The first and second robotic machines may move as a consist.

Figure 3:
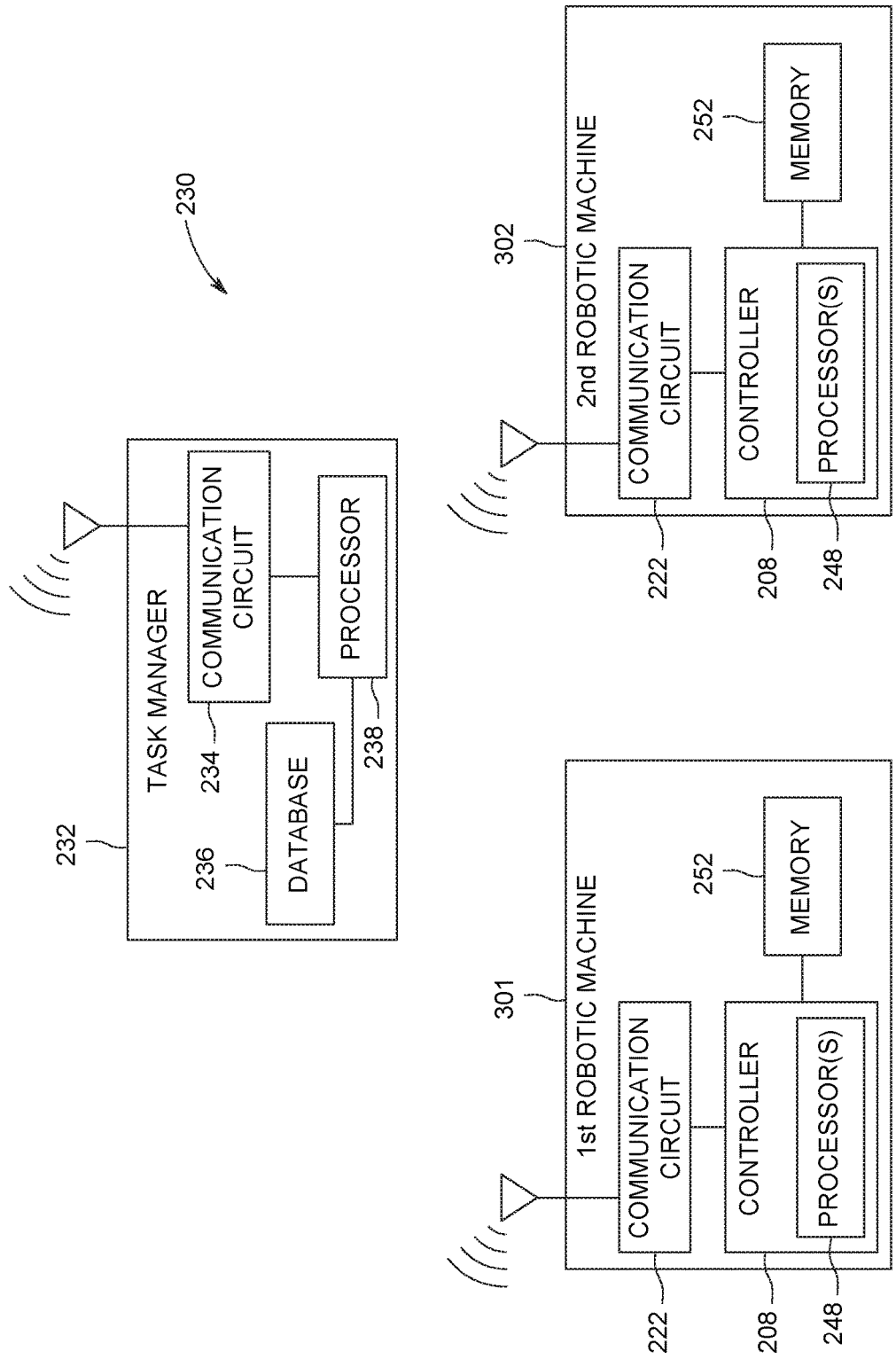
FIG. 3 is a schematic block diagram of a control system for controlling first and second robotic machines to collaborate to perform an assigned task on a vehicle.

FIG. 3 is a schematic block diagram of a control system 230 for controlling first and second robotic machines 301, 302 to collaborate in performing an assigned task on the equipment. The control system may include the first and second robotic machines and a task manager 232. The task manager may be located remote from the first robotic machine and/or the second robotic machine. The task manager may communicate with the robotic machines to provide instructions to the robotic machines regarding the performance of an assigned task that involves manipulating and/or inspecting a target object on the equipment. The first and second robotic machines may use the information received from the task manager to plan and execute the assigned task.

The first and second robotic machines may or may not be the grasping robotic machine and the aerial robotic machine, respectively, of the embodiment shown in FIG. 1. For simplicity of description, FIG. 3 does not illustrate all of the components of the robotic machines, such as the robotic arm and the propellers (both shown in FIG. 1). Each of the robotic machines may include a communication circuit and a controller as described with reference to FIG. 2. Each of the controllers may include one or more processors 248. The controllers may be optionally operatively connected to respective digital memory devices 252.

The task manager may include a communication circuit 234, at least one processor 238, and a digital database 236, which may represent or be contained in a digital memory device (not shown). The processor may be operatively coupled to the database and the communication circuit. The task manager may be or include a computer, a server, an electronic storage device, or the like. The database may be, or may be contained in, a tangible and non-transitory (e.g., not a transient signal) computer readable storage medium. The database stores information corresponding to multiple robotic machines in a group of robotic machines that may include the first and second robotic machines. For example, the database may include a list identifying the robotic machines in the group and providing capabilities or affordances associated with each of the robotic machines in the list. The database may also include information related to one or more potential assigned tasks, such as a sequence of sub-tasks to be performed in order to accomplish or complete the assigned task. Optionally, the database may include information about one or more items of equipment on which an assigned task is to be performed, such as information about types and locations of various potential target objects on the equipment to be manipulated in the performance of an assigned task. The processor may be access the database to retrieve information specific to an assigned task, the equipment on which the assigned task is to be performed, and/or a robotic machine that may be assigned to perform the task. Although shown as a single, unitary hardware device, the task manager may include multiple difference hardware devices communicatively connected to one another. For example, in an embodiment, the task manager may be one or more servers located at a data center, a railroad dispatch location, a control center, or the like.

The task manager may communicate with the first and second robotic machines via the transmission of messages from the communication circuit to the communication circuits of the robotic machines. For example, the task manager may communicate messages wirelessly in the form of electromagnetic radio frequency signals. The first and second robotic machines may transmit messages to the task manager via the respective communication circuits. The robotic machines may be also able to communicate with each other using the communication circuits. For example, the robotic machines may transmit status-containing notification messages back and forth as the robotic machines collaborate to perform an assigned task in order to coordinate the actions of the robotic machines to perform the assigned task correctly and efficiently. Time sensitive networks may be used to coordinate activities requiring a high degree of precision in the coordination.

Figure 4:
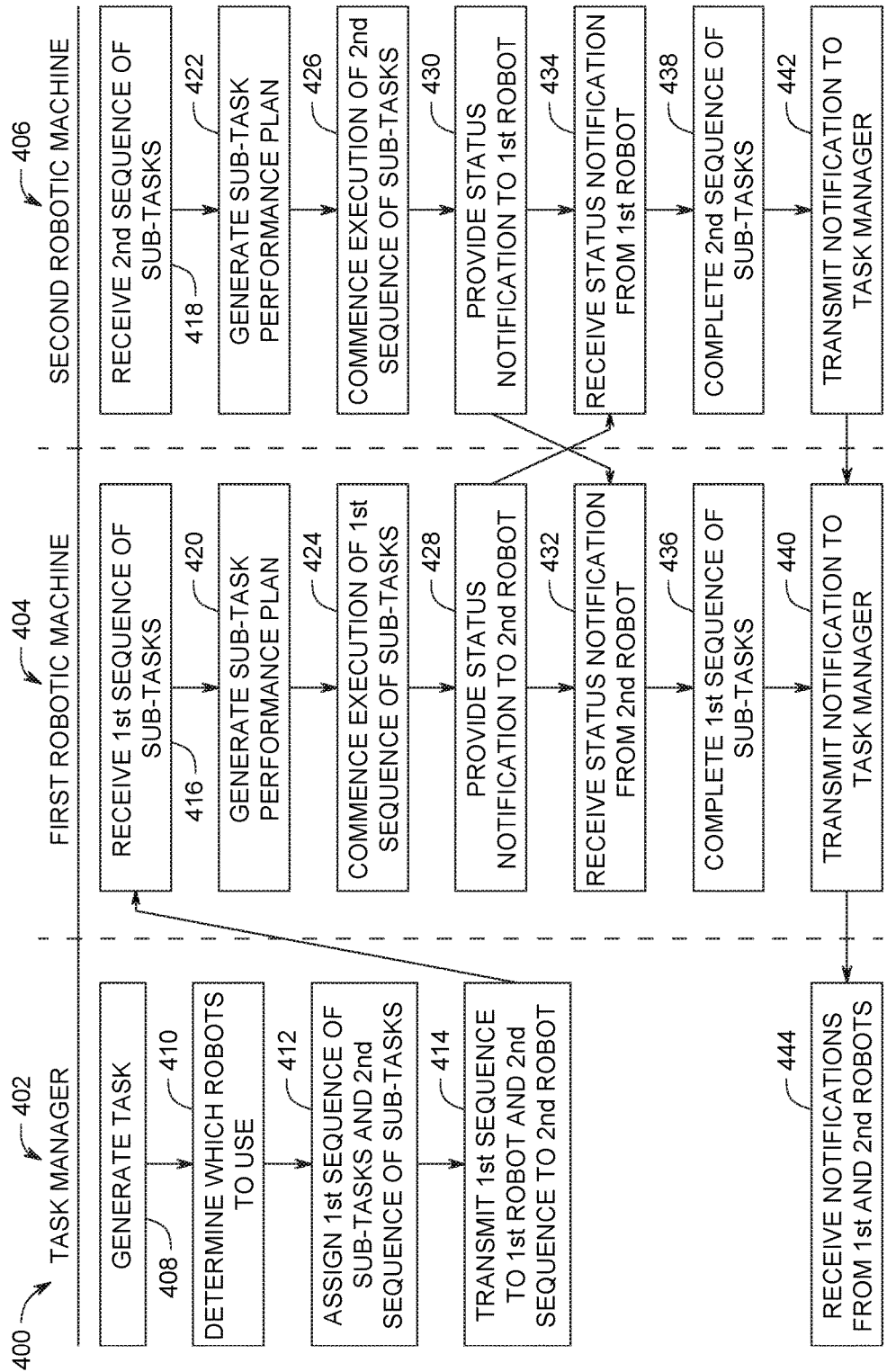
FIG. 4 is a flow diagram showing interactions of a task manager and the first and second robotic machines of FIG. 3 to control and coordinate the performance of an assigned task by the robotic machines on a vehicle according to an embodiment.

FIG. 4 illustrates a flow diagram 400 showing interactions of the task manager and the first and second robotic machines of FIG. 3 to control and coordinate the performance of an assigned task by the robotic machines on the equipment according to an embodiment. The flow diagram is divided into a first column 402 listing actions or steps taken by the task manager, a second column 404 listing actions or steps taken by the first robotic machine, and a third column 406 listing actions or steps taken by the second robotic machine. At step 408, the task manager generates a task that step involves manipulating and/or inspecting a target object on the equipment. Various example tasks may be described above with reference to FIG. 1, including brake bleeding of an air brake system, setting or releasing a hand brake, inspecting a position of a brake actuator (e.g., a lever, a wheel, or the like), mechanically coupling or uncoupling the equipment relative to another the equipment, hose lacing to connect or disconnect an air hose of the equipment to an air hose of another the equipment, or the like. Optionally, the task may be a scheduled task, and the task manager generates a sub-task responsive to the task being due to be performed. Alternatively, the task manager may generate a sub-task upon receiving a request that step the task be performed, such as from a user interface connected to the task manager or from a remote source via a communicated message.

At step 410, the task manager determines which robotic machines (e.g., robots, drones) to employ to work together to perform the designated task. For example, the database of the task manager shown in FIG. 3 may store information about the designated task, including which sub-goals or sub-tasks may be required or at step least helpful to accomplish the designated task efficiently. The sub-tasks may be steps in the process of performing the task, such as moving toward a target object, engaging a certain portion of the target object, and applying a specific force on the target object to move the target object for a specified distance in a specified direction. The database may also store information about a group of multiple robotic machines including, but not limited to, the first and second robotic machines shown in FIG. 3. The information about the robotic machines may include capability descriptions associated with each robotic machine in the group. The capability descriptions may include a list of the capabilities or affordances of the corresponding robotic machine, such as the capability to grasp and pull a lever. A processor of the task manager may perform an affordance analysis by comparing the sub-tasks associated with the designated task to the capability descriptions of the available robotic machines in the group. The processor determines a level of suitability of each of the available robotic machines to the specific sub-tasks for the designated task. The available robotic machines may be ranked according to the level of suitability. For example, robotic machines that are capable of flying would rank highly for sub-tasks involving flight, but robotic machines incapable of flight would rank low for the same sub-tasks. The processor may rank the robotic machines, and determine the robotic machines to employ for the designated task based on the highest ranking available robotic machines for the sub-tasks.

In an example, the designated task involves manipulating a brake actuator, which generally requires a robotic arm engaging the brake actuator to move the brake actuator. If none of the available robotic machines that have robotic arms are tall enough or able to extend far enough to engage the brake actuator, the processor of the task manager may select one of the highest ranking available robotic machines that has a robotic arm. The processor may analyze the rest of the available robotic machines to determine which robotic machines are able to assist the robotic machine with the robotic arm. The processor may select a robotic machine that is capable of lifting the robotic machine having the robotic arm, such that the robotic arm is able to engage and manipulate the brake actuator when lifted. Thus, the task manager may select the robotic machines to employ for performing the designated task based on the suitability of the robotic machines to perform required sub-tasks as well as the suitability of the robotic machines to coordinate with each other.

At step 412, the task manager assigns a first sequence of sub-tasks to a first robotic machine and assigns a second sequence of sub-tasks to a second robotic machine. Although not shown in the illustrated embodiment, the task manager may assign sub-tasks to more than two robotic machines in other embodiments. For example, some tasks may require three or more robotic machines working together to complete. The sequences of sub-tasks may be specific steps or actions to be performed by the corresponding robotic machines in a specific order. The sub-tasks may be similar to instructions. The performance of all of the sub-tasks by the corresponding robotic machines in the correct order may complete or accomplish the assigned task. The first and second sequences of sub-tasks may be coordinated with each other. The first sequence of sub-tasks (to be performed by the first robotic machine) in an embodiment may be at least partially different than the second sequence of sub-tasks (to be performed by the second robotic machine). For example, at least some of the sub-tasks in the first sequence may differ from at least some of the sub-tasks in the second sequence, or vice-versa. Some sub-tasks may be common to both the first and second sequences, such that the sub-tasks may be performed by both robotic machines. In an embodiment, the first and second sequences of sub-tasks delineate specific steps or actions to be performed by the respective robotic machines and provide timing information. For example, the first sequence may specify an order that the sub-tasks are to be performed relative to each other and relative to the sub-tasks in the second sequence to be performed by the second robotic machine. Thus, the first sequence may specify that after completing a given sub-task, the first robotic machine is to wait until receiving a notification from the second robotic machine that a specific sub-task in the second sequence has been completed before starting a subsequent sub-task in the first sequence.

The first and second sequences of sub-tasks may be generated by the at least one processor of the task manager after determining which robotic machines to use, or may be pre-stored in the database or another memory device. For example, the database may store a list of potential assigned tasks and sequences of sub-tasks associated with each of the assigned tasks. Thus, upon generating the task and/or determining the robotic machines, the processor may access the database to select the relevant sequences of sub-tasks associated with the assigned task.

At step 414, the task manager may transmit the first sequence of sub-tasks to the first robotic machine and the second sequence of sub-tasks to the second robotic machine. For example, the first and second sequences may be transmitted in respective command messages via the communication circuit of the task manager. The task manager communicates a command message containing the first sequence of sub-tasks to the first robotic machine and another command message containing the second sequence to the second robotic machine.

At step 416, the first robotic machine receives the command message containing the first sequence of sub-tasks. At step 418 the second robotic machine receives the command message containing the second sequence of sub-tasks. The communication circuits of the first and second robotic machines shown in FIG. 3 receive the command messages and communicate the contents to the respective controllers. At step 420, the first robotic machine generates a sub-task performance plan based on the first sequence of sub-tasks.

The sub-task performance plan may be motion planning by the first robotic machine that yields various motions, actions, and forces, including torques, to be produced by different components of the first robotic machine to perform the sub-tasks in the first sequence. The processors of the first robotic machine may use dynamic movement primitives to generate the performance plan. In an embodiment in which the first robotic machine may include the robotic arm (shown in FIG. 2), the sub-task performance plan may include a motion trajectory that plans the movement of the robotic arm from a starting position to the target object on the equipment. The sub-task performance plan may also provide a prescribed approach orientation of the robotic arm, including the claw of the end effector (shown in FIG. 2), as the robotic arm approaches and engages the target object, and planned forces to be exerted by the robotic arm on the target object to manipulate the target object (e.g., a planned pulling force, direction of the force, and/or distance along which the force may be applied). In other embodiments, the sub-task performance plan may specify coordinates and/or distances that the first robotic machine, or components thereof, moves. At step 422, the second robotic machine generates a sub-task performance plan based on the second sequence of sub-tasks. The sub-task performance plan of the second robotic machine may be different than the sub-task performance plan of the first robotic machine, but may be generated in a similar manner to the sub-task performance plan of the first robotic machine.

At step 424, the first robotic machine commences execution of the first sequence of sub-tasks. At step 426, the second robotic machine commences execution of the second sequence of sub-tasks. Although steps 424 and 426 are shown side-by-side in the diagram 400 of FIG. 4, the first and second robotic machines may or may not perform the respective sub-tasks during the same time period. Depending on the sequences of sub-tasks as communicated by the task manager, the first robotic machine may be ordered to start performing the sub-tasks in the first sequence before or after the second robotic machine starts performing the second sequence of sub-tasks.

In an embodiment, the first and second robotic machines may coordinate performance of the respective sequences of sub-tasks to accomplish the assigned task. Thus, the performance of the first sequence of sub-tasks by the first robotic machine may be coordinated with the performance of the second sequence of sub-tasks by the second robotic machine. In an embodiment, the first and second robotic machines coordinate by communicating directly with each other during the performances of the sub-tasks. At step 428, the first robotic machine provides a status notification to the second robotic machine. The status notification may be a message communicated wirelessly as electromagnetic RF signals from the communication circuit of the first robotic machine to the communication circuit of the second robotic machine. The second robotic machine receives the status notification at step 434. The status notification may inform the second robotic machine that the first robotic machine has started or completed a specific sub-task in the first sequence. The second robotic machine processes the received status notification and may use the status notification to determine when to start performing certain sub-tasks in the second sequence. For example, at least some of the sub-tasks in the first and second sequences may be sequential, such that the second robotic machine may begin performance of a corresponding sub-task in the second sequence responsive to receiving the notification from the first robotic machine that the first robotic machine has completed a specific sub-task in the first sequence. Other sub-tasks in the first and second sequences may be performed concurrently by the first and second robotic machines, such that the time period that the first robotic machine performs a given sub-task in the first sequence at least partially overlaps the time period that the second robotic machine performs a given sub-task in the second sequence. For example, both robotic machines may concurrently move towards the equipment. In another example, the first robotic machine may extend a robotic arm towards the target object of the equipment concurrently with the second robotic machine lifting the first robotic machine. Coordinated and concurrent actions by the robotic machines may enhance the efficiency of the performance of the assigned task on the equipment.

The first robotic machine may transmit a status notification upon starting and/or completing each sub-task in the first sequence, or may transmit status notifications only upon starting and/or completing certain designated sub-tasks of the sub-tasks in the first sequence, which may be identified in the command message sent from the task manager. At step 430, the second robotic machine provides a status notification to the first robotic machine. The status notification from the second robotic machine may be similar in form and/or function to the status notification sent from the first robotic machine at step 428. The first robotic machine receives the status notification from the second robotic machine at step 432.

At steps 436 and 438, respectively, the first and second robotic machines complete the performances of the first and second sequences of sub-tasks. At step 440, the first robotic machine transmits a task completion notification to the task manager that the first sequence may be completed. At step 442, the second robotic machine transmits a task completion notification to the task manager that the second sequence was completed. The first and second robotic machines may also notify each other upon completing the sequences of sub-tasks, and optionally may only transmit a single task completion notification to the task manager instead of one notification from each robotic machine. The one or more notifications inform the task manager that the assigned task was completed. At step 444, the task manager receives and processes the one or more notifications. The notification may also provide feedback information to the task manager, such as force parameters used to manipulate the target object on the equipment and other parameters monitored and recorded during the performance of the sub-tasks. The information received in the task completion notification may be used by the task manager to update the information provided in future command messages to robotic machines, such as the sequences of sub-tasks contained in the command messages. Upon receiving the task completion notification, the task manager may generate a new task for the same or different robotic machines. For example, the task manager may assign the same task to the same robotic machines for the robotic machines to perform the task on another the equipment in the same or a different the equipment system. Thus, the first and second robotic machines may be controlled to move along a length of the equipment system to perform the assigned task on multiple items of equipment of the equipment system. Alternatively, the task manager may control the same or different robotic machines to perform a different assigned task on the same equipment after completion of a first assigned task on the equipment.

Figure 5:
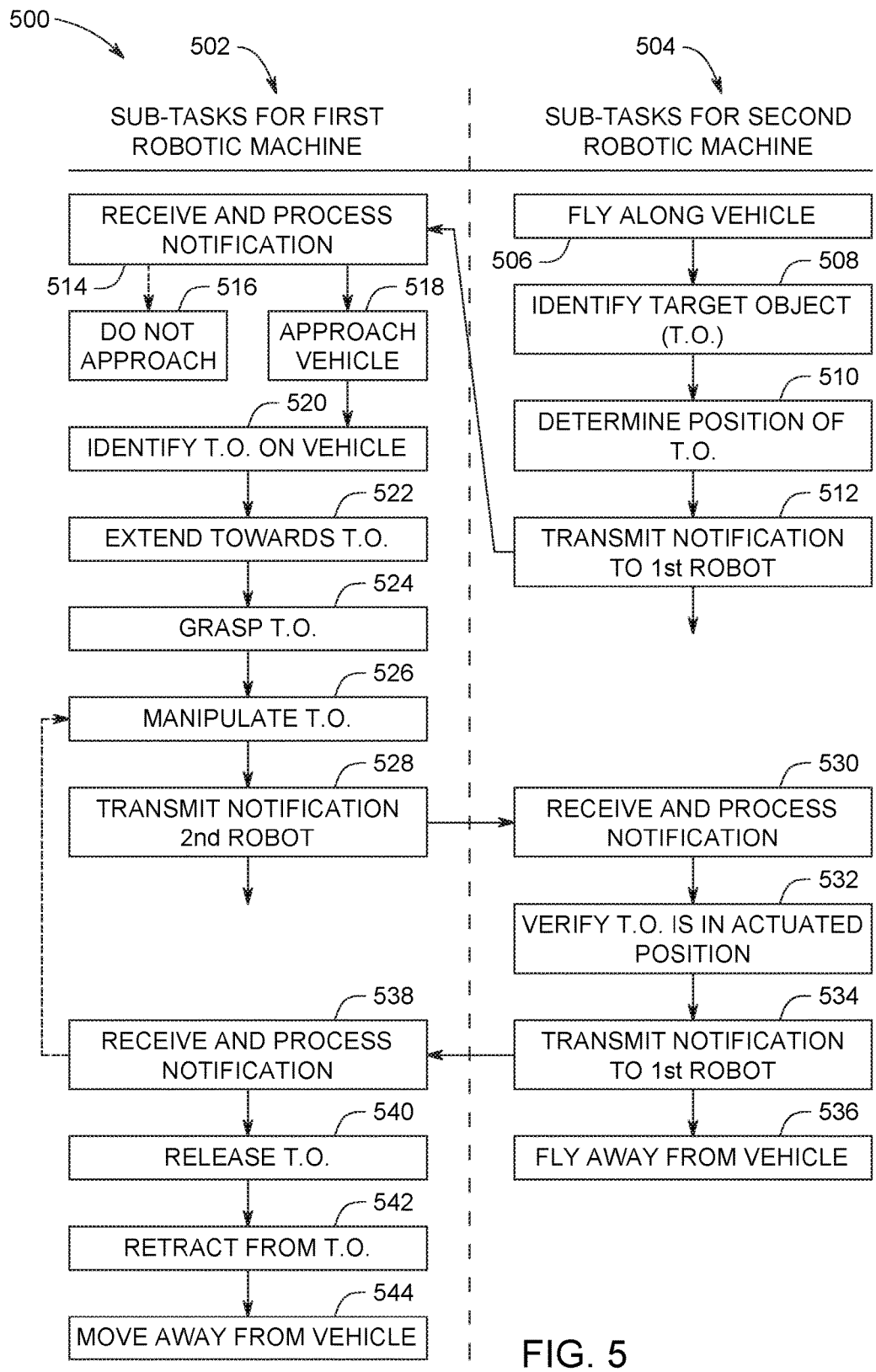
FIG. 5 is a block flow diagram showing a first sequence of sub-tasks assigned to a first robotic machine and a second sequence of sub-tasks assigned to a second robotic machine for performance of an assigned task on a vehicle according to an embodiment.

FIG. 5 is a block flow diagram 500 showing a first sequence 502 of sub-tasks assigned to a first robotic machine and a second sequence 504 of sub-tasks assigned to a second robotic machine for performance of an assigned task on the equipment according to an embodiment. The diagram may be described with reference to the grasping robotic machine and the aerial second robotic machine shown in FIG. 1. In the illustrated embodiment, the assigned task may be to manipulate a brake actuator of the first equipment of FIG. 1, such as the brake wheel of the hand brake system or the brake lever of the air brake system. The first and second sequences 502, 504 of sub-tasks may be transmitted to the grasping and aerial robotic machines by the task manager (shown in FIG. 3).

The first sub-task in the second sequence 504 at step 506 commands the aerial robotic machine to fly along the first equipment, such as above or along a side of the first equipment. At step 508, the aerial robotic machine identifies the target object, which may be the brake actuator. The aerial robotic machine may use the imaging device to generate image data of the surrounding environment including the first equipment. One or more processors of the aerial robotic machine may provide image analysis to identify the brake actuator in the image data captured by the imaging device. The aerial robotic machine at step 510 determines a position of the target object, such as a location of the brake actuator relative to the first equipment and/or whether the brake actuator is in an actuated or non-actuated position relative to the first equipment. For example, if the aerial robotic machine determines that the brake actuator is already in an actuated position, there may be no need to manipulate the brake actuator. The actuated position may represent, for example, a pulled position of the brake lever that indicates that step the air brake may be bled, or a rotated position of the brake wheel that indicates that the hand brakes may be released. The aerial robotic machine determines the position of the target object using image analysis. At step 512, the aerial robotic machine transmits a status notification to the grasping robotic machine. The status notification may be similar to the status notifications described at step 428 and 430 in FIG. 4. The status notification provides the position of the target object to the grasping robotic machine.

At step 514, the grasping robotic machine receives and processes the status notification transmitted by the aerial robotic machine. The processors (e.g., the processors shown in FIG. 3) of the robotic machine determine whether or not to approach the first equipment. For example, since the task may be to actuate a brake actuator of the first equipment, if the status notification indicates that the brake actuator may be already in the actuated position, then there may be no need to manipulate the brake actuator. Thus, if the brake actuator is in the actuated position, the grasping robotic machine at step 516 does not approach the equipment. Instead, the robotic machine may move towards another equipment on which the robotic machine may be assigned to perform a task. If, on the other hand, the brake actuator is determined by the aerial robotic machine to be in a non-actuated position, then the grasping robotic machine at step 518 approaches the equipment. For example, the robotic machine may drive or otherwise move along the ground towards the equipment and proximate to the brake actuator thereof.

At step 520, the grasping robotic machine identifies the target object on the first equipment. The robotic machine may identify the target object using image analysis based on image data captured by the imaging sensor (shown in FIG. 2). The image analysis may determine the location, tilt, size, and other parameters of the target object. At step 522, the robotic machine extends towards the target object. For example, the robotic arm (shown in FIG. 1) may extend from a retracted position to an extended position by generating torques at step various joints along the arm and/or by telescoping. At step 524, the robotic machine grasps and engages the target object. For example, the claw of the end effector (shown in FIG. 2) may grasp the brake actuator that step defines the target object. At step 526, the robotic machine manipulates the target object. In an embodiment, the robotic arm manipulates the brake actuator by moving the brake actuator from the non-actuated position to the actuated position. The robotic arm may rotate the brake wheel, translate the brake lever, or the like, to move the brake actuator to the actuated position. Upon manipulating the brake actuator, the grasping robotic machine at step 528 generates and transmits a status notification to the aerial robotic machine. The status notification informs the aerial robotic machine that the target object has been manipulated.

At step 530, the aerial robotic machine receives and processes the status notification received from the grasping robotic machine. Responsive to being notified that the target object has been manipulated, the aerial robotic machine at step 532 verifies whether or not the target object is fully actuated (e.g., has been fully and successfully manipulated to complete the task). For example, for a task to bleed air brakes, the verification may include validating that the valve of the air brake system has been sufficiently opened such that a sufficient amount of air has been released from the air brake system to allow the brake to move to a released state. Verification by the aerial robotic machine may be accomplished by various methods, including audibly recording the release of air using an audible sensor, detecting movement of the brakes to the released state using the imaging device, detecting that the brake lever is in a designated actuated position using the imaging device, and/or the like. Although not shown, the grasping robotic machine may also verify whether the brake lever is fully actuated, such as by using the encoder to detect that the robotic arm has moved the lever to a designated location, using the force sensor to detect the force exerted on the brake lever, and/or the like.

After the verification step, the aerial robotic at step 534 transmits a status notification to the grasping robotic machine, which may be received by the robotic machine at 538. The status notification contains the results of the verification step, such as whether or not the brake actuator has been fully actuated and the task has been successfully completed. If the status notification indicates that the brake actuator is not in the actuated position, then the grasping robotic machine may return to step 526 and manipulate the brake actuator a second time. If, on the other hand, the status notification indicates that the brake actuator is actuated and the task has been successfully completed, then the grasping robotic machine may, at step 540, control the robotic arm to release the brake actuator that defines the target object. At step 542, the robotic arm retracts away from the target object, returning to a retracted position on the robotic machine. At step 544, the grasping robotic machine moves on the ground away from the first equipment.

At step 536, the aerial robotic machine flies away from the first equipment. For example, the aerial robotic machine may fly towards a subsequent item of equipment (e.g., the second equipment shown in FIG. 1), and may repeat the first sequence at step 504 of sub-tasks for the second equipment. Although not shown, the aerial robotic machine may provide guidance for the grasping robotic machine as the grasping robotic machine moves along the ground. The aerial robotic machine provides guidance by monitoring for obstacles along a path of the robotic machine, and may notify the robotic machine if the aerial robotic machine detects the presence of an obstacle.

As shown in FIG. 5, the two robotic machines collaborate during the performance of the respective sub-tasks to accomplish the assigned task. The aerial robotic machine may inspect the target object, verify actuation of the target object, and/or provide guidance for the grasping robotic machine. The grasping robotic machine may engage and manipulate the target object on the equipment. It may be recognized that at least some of the sub-tasks in the first and second sequences 502, 504 may be sequential, and at least some may be concurrent. For example, the grasping robotic machine does not approach the equipment at step 518 until receiving the notification from the aerial robotic machine that is transmitted at step 512. The aerial robotic machine may perform the sub-task of flying away from the equipment at step 536 concurrently to the grasping robotic machine releasing the target object, retracting from the target object, and/or moving away from the equipment at steps 540-544.

Figure 6:
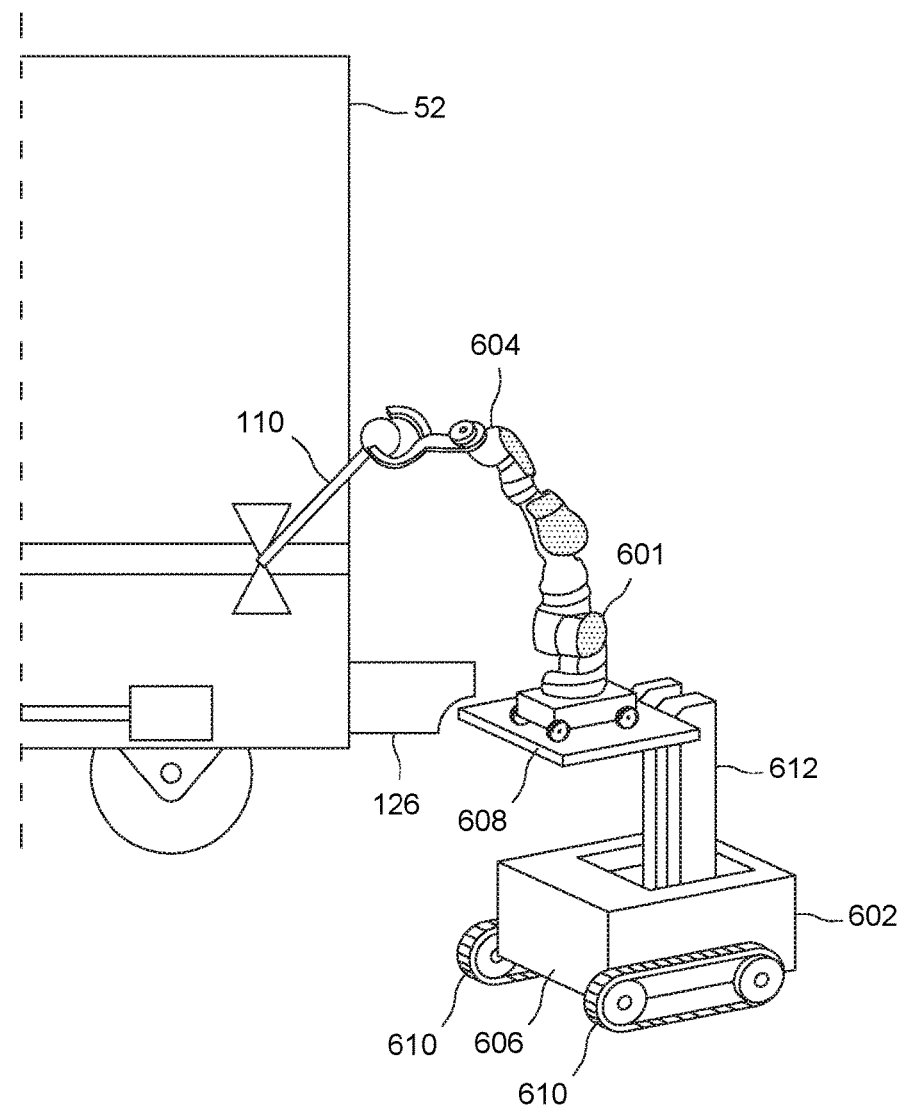
FIG. 6 is a perspective view of two robotic machines collaborating to perform an assigned task on a vehicle according to another embodiment.

FIG. 6 is a perspective view of two robotic machines collaborating to perform an assigned task on the first equipment according to another embodiment. The task involves pulling a brake lever of the first equipment. A first robotic machine 601 may be a grasping robotic machine that may include a robotic arm 604 and may be at least similar to the grasping robotic machine shown in FIG. 2. In the illustrated embodiment, the grasping robotic machine may be too short and cannot extend far enough to properly reach and engage the brake lever. A second robotic machine 602 may be a lifting robotic machine that may be collaborate with the grasping robotic machine 601 to perform the assigned task. The lifting second robotic machine may include a body 606 and a platform 608 that may be movable vertically relative to the body. The body may include continuous tracks 610 for allowing the second robotic machine to navigate obstacles and rocky terrain. The platform may be coupled to the body via a telescoping tower 612 that may be used to lift and lower the platform relative to the body.

In the illustrated embodiment, the assigned task may be performed by the lifting second robotic machine and the grasping first robotic machine each performing a respective sequence of sub-tasks (e.g., assigned by a task manager). For example, a first sequence of sub-tasks for the grasping robotic machine may include driving onto the platform of the lifting robotic machine, when the platform may be in a lowered, starting location at or proximate to the ground. A second sequence of sub-tasks for the lifting robotic machine may include lifting the grasping robotic machine on the platform vertically upwards from the starting location to a lifted location that may be disposed more proximate to the brake lever (or another target object) than when the grasping robotic machine is in the starting location. Once the grasping robotic machine is in the lifted location, the robotic arm extends to the brake lever, grasps the brake lever, and manipulates the brake lever by pushing or pulling in a designated direction. After manipulating the brake lever and verifying that the brake lever manipulation has been successfully completed, the grasping robotic machine sends a notification to the lifting robotic machine. Responsive to receiving the notification, the lifting robotic machine lowers the platform, and the grasping robotic machine thereon, back to the starting location on or proximate to the ground. Alternatively, the lifting robotic machine may lower the platform to an intermediate location, and may carry the grasping robotic machine to another the equipment for performance of the same or a similar task on the other the equipment. An additional robotic machine, such as the aerial robotic machine shown in FIG. 1, optionally may be employed to collaborate with the robotic machines 601, 602 in the performance of the assigned task.

Figure 7:
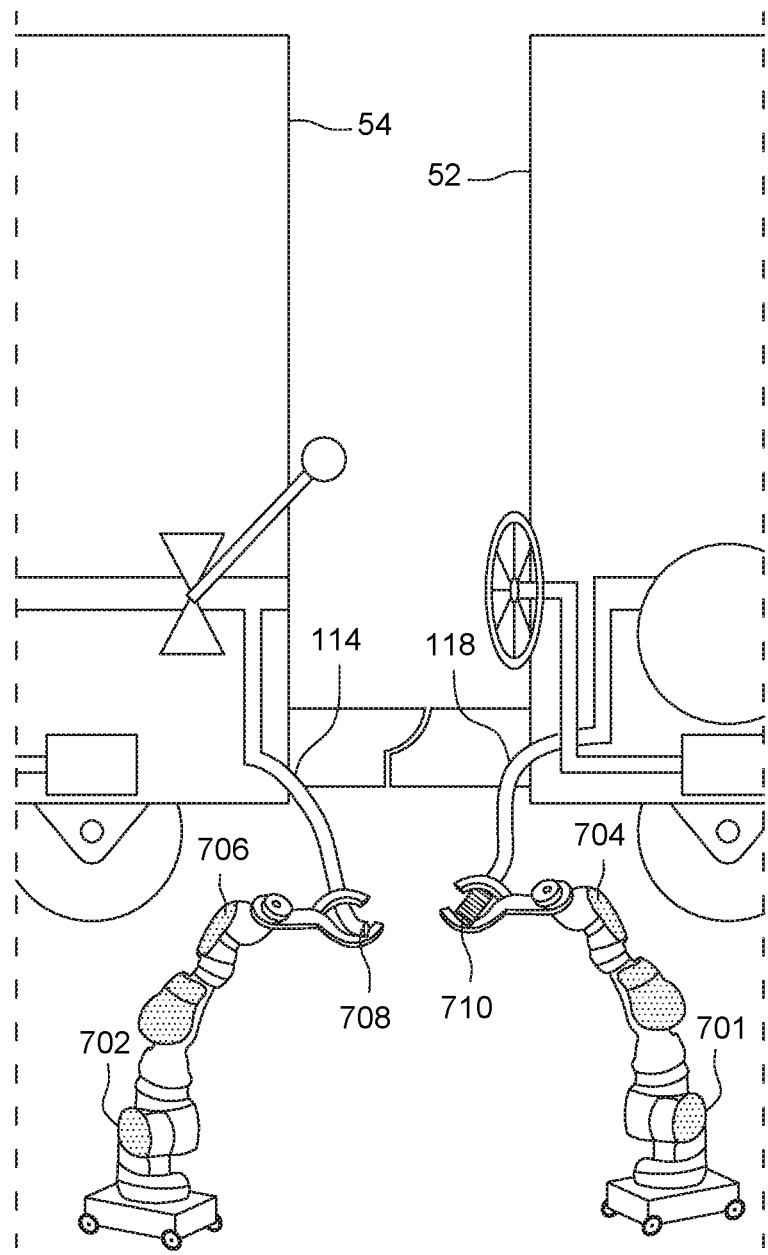
FIG. 7 is a perspective view of two robotic machines collaborating to perform an assigned task on a first vehicle according to yet another embodiment.

FIG. 7 is a perspective view of two robotic machines 701, 702 collaborating to perform an assigned task on a first equipment according to yet another embodiment. The assigned task involves connecting a second air hose of the first equipment to a corresponding first air hose of a second equipment adjacent to the first equipment. The task may be referred to as hose lacing. The two robotic machines may both be grasping robotic machines at least similar to the grasping robotic machine in FIG. 2. A first robotic machine 701 and a second robotic machine 702 include respective first and second robotic arms 704, 706, each similar to the robotic arm shown in FIG. 2.

In an embodiment, the first robotic machine performs the first sequence of sub-tasks by locating and identifying the second air hose of the first equipment, then extending the first robotic arm and grasping the second air hose. The second robotic machine performs the second sequence of sub-tasks by locating and identifying the first air hose of the second equipment, then extending the second robotic arm and grasping the first air hose. The second sequence of sub-tasks may instruct the second robotic machine to adjust an orientation of an end 708 of the first air hose to a designated orientation relative to the first equipment. The first sequence of sub-tasks may instruct the first robotic machine to adjust both the position and orientation of an end 710 of the second air hose. The first robotic arm of the first robotic machine may move relative to the second robotic arm of the second robotic machine towards the first air hose in order to connect the end of the second air hose to the end of the first air hose. One or both of the robotic arms may move and/or rotate to secure the hoses to one another, such as via a bayonet-style connection. The robotic machines may coordinate the movements by communicating directly with each other during the performance of the assigned task. The robotic machines may also be configured to collaborate to disconnect the air hoses in another assigned task.

In an embodiment, a system (e.g., a control system) may include a first robotic machine, a second robotic machine, and a task manager. The first robotic machine has a first set of capabilities for interacting with a surrounding environment. The second robotic machine has a second set of capabilities for interacting with the surrounding environment. The task manager has one or more processors. The task manager may select the first and second robotic machines from a group of robotic machines to perform a task that involves at least one of manipulating or inspecting a target object of the equipment that may be separate from the first and second robotic machines. The task manager may select the first and second robotic machines to perform the task based on the first and second sets of capabilities of the respective first and second robotic machines. The task manager assigns a first sequence of sub-tasks to the first robotic machine for performance by the first robotic machine and a second sequence of sub-tasks to the second robotic machine for performance by the second robotic machine. The first and second robotic machines may coordinate performance of the first sequence of sub-tasks by the first robotic machine with performance of the second sequence of sub-tasks by the second robotic machine to accomplish the task.

Optionally, the first and second sets of capabilities of the first and second robotic machines each include at least one of flying, driving, diving, lifting, imaging, grasping, rotating, tilting, extending, retracting, pushing, pulling, welding, cutting, polishing, spraying, and/or the like. The second set of capabilities of the second robotic machine may include at least one capability that differs from the first set of capabilities of the first robotic machine. The task may include actuating a lever to open a valve of the equipment.

Optionally, the first and second robotic machines coordinate performance of the first sequence of sub-tasks by the first robotic machine with the performance of the second sequence of sub-tasks by the second robotic machine by communicating directly with each other. Responsive to completing a corresponding sub-task in the first sequence, the first robotic machine may notify the second robotic machine that the corresponding sub-task is complete. At least some of the sub-tasks may be sequential such that the second robotic machine may begin performance of a corresponding sub-task in the second sequence responsive to receiving a notification from the first robotic machine that the first robotic machine has completed a specific sub-task in the first sequence. The first robotic machine may perform at least one of the sub-tasks in the first sequence concurrently with performance of at least one of the sub-tasks in the second sequence by the second robotic machine.

Optionally, the task manager may access a database that stores capability descriptions corresponding to each of the robotic machines in the group of robotic machines. The task manager may select the first and second robotic machines to perform the task instead of other robotic machines in the group based on a suitability of the capability descriptions of the first and second robotic machines to the task. The first robotic machine may perform the first sequence of sub-tasks by lifting the second robotic machine from a starting location to a lifted location such that the second robotic machine in the lifted location may be disposed more proximate to the target object of the equipment than when the second robotic machine is in the starting location. Responsive to receiving a notification from the second robotic machine that at least one of manipulation or inspection of the target object is complete, the first robotic machine may lower the second robotic machine back to the starting location.

Optionally, the first robotic machine may perform the first sequence of sub-tasks by flying above or along a side of the equipment, identifying the target object of the equipment, determining a position of the target object, and providing a notification to the second robotic machine of the position of the target object. The second robotic machine performs the second sequence of sub-tasks by moving on the ground to the equipment proximate to the target object, extending a robotic arm of the second robotic machine to the target object, engaging and manipulating the target object, releasing the target object, and retracting the robotic arm.

Optionally, multiple items of equipment may be coupled together. The first robotic machine may perform the first sequence of sub-tasks by extending a robotic arm of the first robotic machine and grasping a target object of the first equipment. The second robotic machine may perform the second sequence of sub-tasks by extending a robotic arm of the second robotic machine to a target object of the second equipment adjacent to the first equipment. The robotic arms of the first and second robotic machines move relative to one another with the corresponding target objects to at least one of connect or disconnect them.

In an embodiment, a system (e.g., a control system) includes a first robotic machine and a second robotic machine. The first robotic machine has a first set of capabilities for interacting with a surrounding environment. The first robotic machine may receive a first sequence of sub-tasks related to the first set of capabilities of the first robotic machine. The second robotic machine has a second set of capabilities for interacting with the surrounding environment. The second robotic machine may receive a second sequence of sub-tasks related to the second set of capabilities of the second robotic machine. The first and second robotic machines may perform the first and second sequences of sub-tasks, respectively, to accomplish a task that involves at least one of manipulating or inspecting a target object of the equipment that may be separate from the first and second robotic machines. The first and second robotic machines may coordinate performance of the first sequence of sub-tasks by the first robotic machine with performance of the second sequence of sub-tasks by the second robotic machine.

Optionally, the second set of capabilities of the second robotic machine may include at least one capability that differs from the first set of capabilities of the first robotic machine. At least some of the sub-tasks may be sequential such that the second robotic machine may be begin performance of a corresponding sub-task in the second sequence responsive to receiving a notification from the first robotic machine that the first robotic machine has completed a specific sub-task in the first sequence. The first robotic machine may perform the first sequence of sub-tasks by moving the second robotic machine from a starting location to a moved location such that the second robotic machine in the moved location and thereby disposed proximate to the target object of the equipment more so than when the second robotic machine was in the starting location. Responsive to receiving a notification from the second robotic machine that at least one of manipulation or inspection of the target object is complete, the first robotic machine lowers the second robotic machine back to the starting location.

In an embodiment, a system includes a first robotic machine that has a set of capabilities for interacting with a surrounding environment. The first robotic machine has a communication circuit that can receive a first sequence of sub-tasks for performing a task that involves at least one of manipulating or inspecting a target object of the equipment. The first sequence of sub-tasks may relate to the set of capabilities of the first robotic machine. The first robotic machine may perform the first sequence of sub-tasks. The first robotic machine may communicate with a second robotic machine during the performance of the first sequence of sub-tasks. The second robotic machine may perform a second sequence of sub-tasks for performing the task. Completion of both the first and second sequences of sub-tasks accomplishes the task. The first robotic machine may communicate with the second robotic machine during the performance of the first sequence of sub-tasks to coordinate with the second robotic machine such that the first robotic machine starts a corresponding sub-task in the first sequence responsive to a received notification from the second robotic machine that the second robotic machine has at least one of started or completed a specific sub-task in the second sequence. Responsive to completing a corresponding sub-task in the first sequence, the first robotic machine may transmit a notification to the second robotic machine that the corresponding sub-task is complete. The first robotic machine has a movable robotic arm. The set of capabilities include the robotic arm extending relative to the first robotic machine, grasping the target object, manipulating the target object, releasing the target object, and retracting relative to the first robotic machine.

In one embodiment, each robotic machine is equipped with one or more sensors and tools. Suitable sensors may include force-torque (F/T) sensors, tactile sensors, encoders, cameras, chemical sensors, bio-sensors, lidar, radar, time-of-flight (TOF) sensors, thermometers, pressure sensors, acoustic and vibration sensors, accelerometers (e.g., position, angle, displacement, speed and acceleration sensors), magnetic sensors, electric current or electric potential sensors (e.g., voltage sensors), radiation sensors, and triangulation sensors. Suitable triangulation sensors may include microwave sensors and camera sensors. In a collaborative robotic team, robotic machines may have different capabilities for different tasks or for different subtasks of a give task. In this way, the sensor function may be distributed across a number of robotic machines. For example, one robot can have camera sensor, one robot can have an infrared (IR) sensor, and one robot can have acoustic sensors. The robot with the visual optical camera sensor may have a light source to produce both visible and infrared light. The camera might then record an image of a working area on the work object, while the IR sensor may use the IR spectrum from the light source for triangulation of a tool, being manipulated by its supporting robotic machine, with regard to the work object. For example, an 880 nm LED light source may emit a collimated, near-infrared light beam. The beam bounces off the work object and/or another robotic machine, and is received by a photodiode positioned adjacent to the LED source. A second photodiode (or a linear array of photodiodes) may be positioned farther along the length of the sensor. When the emitted beam bounces off a determine target, the reflected energy is concentrated on the first adjacent photodiode. When an object, such as an arm with a tool of another robotic machine, moves into the optical path, the reflected beam bounces back from the object. Because the beam is no longer traveling the full optical path length, its reflected angle changes. One of the adjacent photodiodes may receive or sense the optical energy and the first robotic machine responds by sending a signal to the second robotic machine. At that point the second robotic machine may slow or stop movement of the arm to prevent or reduce the chance of a collision. In this way, the robotic machines can share information with each other to perform some tasks or subtasks. In one embodiment, various robotic machines, or portions of such machines, have one or more register marks. These register marks may be sensed by various sensors communicatively coupled to the task manager or other robotic machines. When sensed, the distance, orientation, and location of the register mark (and by extension a tool of a robotic machine) may be determined. Additionally or alternatively, bar codes (2D and/or 3D) disposed on a portion of a robotic machine may be used to both identify the robotic machine (or portion thereof) and act as a register mark when sensed by a sensor.

The robotic machines can have implements (e.g., tools and tool sets) that differ from each other. For example, various robotic machines may each have one or more of: 2-finger grippers, multi-finger grippers, magnet grippers, vacuum grippers, screw drivers, wrench, welding tool, rotary saw, grinder, impact hammer, and the like. Accordingly, while performing a subtask the sensors from one or more robotic machines may be used to guide the tools of one or more other robotic machines.

With regard to communication between robotic machines working on a task, in one embodiment a centralized task manager coordinates communication among robots and acts as a communication hub. That is, each robotic machine communicates with the hub but not necessarily with each other. In another embodiment, the robotic machines may have both centralized communication and distributed communication. That is, the robotic machines can both communicate through the task manager and communicate to each other directly. Alternatively, once a task has been assigned, the robotic machines may only communicate with each other and may not communicate back to a central task manager. Further, with regard to an embodiment in which a task manager is not available or is not used, the robotic machines may function autonomously. They may identify tasks to be done and assign robotic machines to perform that task. They further may assign out sub-tasks for that task to the plurality of assigned robotic machines.

Suitable robotic machines may be mobile and have wheels, tracks, a plurality of legs, rotors, propellers, and the like. Other robotic machines may be stationary, and the work object and/or other mobile robotic machines may be brought to the stationary robotic machine. The concept of stationary and mobile may be extended to include where an otherwise mobile robotic machine anchors itself, at least temporarily, relative to the work object and/or another robotic machine. In one embodiment, the robotic machine anchors itself directly to the work object. It may do this using implements. In another embodiment, the robotic machine anchors itself to a portion of the nearby environment (e.g., the ground). Suitable environmental anchors may include stabilizing legs, drills or augers, clamps, and the like.

In one embodiment, the task manager may include a protected space data source and an exposed space data source. The protected space data source might store, for each of a plurality of monitoring nodes, a series of normal values that represent normal operation of a system such as those systems described herein. Such values may be generated by a model or collected from actual monitoring node data, or simply set as factory standards. A monitoring node refers to, for example, location signals, sensor data, signals sent to actuators, motors, pumps, and auxiliary equipment, intermediary parameters that are not direct sensor signals not the signals sent to auxiliary equipment, and/or control logical(s). These may represent, for example, monitoring nodes that receive data from an exposed monitoring system in a continuous fashion in the form of continuous signals or streams of data or combinations thereof. This exposed monitoring system stores data and information in the exposed space data source. Moreover, the monitoring nodes may be used to monitor occurrences of communication faults, cyber-threats or other abnormal events. This data path may be designated specifically with encryptions or other protection mechanisms so that the information may be secured and not be tampered with via cyber-attacks. The exposed space data source might store, for each of the monitoring nodes, a series of values that represent an undesirable operation of the system (e.g., when the system is experiencing a cyber-attack). Suitable encryption protocols may be used, such as hashing (e.g., MD5, RIPEMD-160, RTRO, SHA-1, SHA-2, Tiger, WHIRLPOOL, RNGss, Blum Blum Shub, Yarrowm etc.), key exchange encryption (e.g., Diffie-Hellman key exchange), symmetric encryption methods (e.g., Advanced Encryption Standard (AES), Blowfish, Data Encryption Standard (DES), Twofish, Threefish, IDEA, RC4, Tiny Encryption algorithm, etc.), asymmetric encryption methods (e.g., Rivest-Shamir-Adlemen (RSA), DAS, ElGamal, Elliptic curve cryptography, NTRUEncrypt, etc.), or a combination thereof.

During operation, information from the protected space data source and the exposed space data source may be evaluated by the task manager to identify a decision boundary (that is, a boundary that separates desired behavior from undesired behavior). If data or information flowing from the monitoring nodes, when evaluated, identifies with the protected space data source, or within an determined limit relative thereto, the task manager will continue operation normally. However, if the data or information in the exposed space data source crosses the decision boundary, the task manager may initiate a safe mode in response. The safe mode may be, in one embodiment, a soft shutdown mode that it intended to avoid damage or injury based on the shutdown itself.

In one embodiment, the first robotic machine may include one or more sensors to detect one or more characteristics of a target object and a second robotic machine may include one or more effectors to perform an operation based on a task assigned by the task manager. The operation may be to assess, repair, and/or service the target object. The robot system may include a processing system that includes one or more processors operatively coupled to memory and storage components. While this may be conceptualized and described in the context of a single processor-based system to simplify explanation, the overall processing system used in implementing a task management system as discussed herein may be distributed throughout the robotic machines and/or implemented as an off-board centralized control system. With this in mind, the processor may generate a set of sub-tasks to assess the target object for defects. For example, the task manager may determine a task including the sub-tasks (e.g., desired inspection coverage of the target object) and/or resources (e.g., robot machine capabilities) available. Based on the generated set of sub-tasks, the task manager may implement the task by sending signal(s) to the robotic machines and thereby provide sub-task instructions to perform the task. A controller of each robotic machine may process any received instructions and in turn signal(s) to one or more implements controlled by the respective robotic machine to control operation and to perform the assigned sub-tasks.

The task may include a plurality of sub-tasks to be collectively performed by at least the first and second robotic machines. Further, the task manager may adjust (e.g., revise) the sub-tasks based on the data received from sensors related to the target object. For example, the sub-task may be adjusted based on acquired data indicative of a potential defect of the target object. The task manager may send a signal(s) encoding or conveying instructions to travel a specified distance and/or direction that enables the robotic machine to acquire additional data related to the target object associated with the potential defect.

Upon performing the assigned tasks, the task manager may assess the quality of data received from the sensors. Due to a variety of factors, the quality of the data may be below a threshold level of quality. For example, pressure sensors or acoustic sensors may have background noise due to the conditions proximate to the target object. As such, the task manager may determine a signal-to-noise ratio of the signals from the sensors that indicates a relationship between a desired signal and background noise. If the task manager determines that the signal-to-noise ratio falls below a threshold level of quality, the task manager may adapt the sub-task to acquire additional data and/or improve the quality of the data feed. If the task manager determines that the signal-to-noise ratio is above a threshold level of quality, the task manager may proceed to perform maintenance actions associated with the sub-tasks based on the sensor data.

In certain embodiments, to perform maintenance actions, the task manager may generate, maintain, and update a digital representation of the target object based on one or more characteristics that may be monitored using robotic machine intermediaries and/or derived from known operating specifications. For example, the task manager may create a digital representation that includes, among other aspects, a 3D structural model of the target object (which may include separately modeling components of the target object as well as the target object as a whole). Such a structural model may include material data for one or more components, lifespan and/or workload data derived from specifications and/or sensor data, and so forth. The digital representation, in some implementations may also include operational or functional models of the target object, such as flow models, pressure models, temperature models, acoustic models, lifting models, and so forth. Further, the digital representation may incorporate or separately model environmental factors relevant to the target object, such as environmental temperature, humidity, pressure (such as in the context of a submersible target object, airborne target object, or space-based target object). As part of maintaining and updating the digital representation, one or more defects in the target object as a whole or components of the target object may also be modeled based on sensor data communicated to the processing components.

Depending on the characteristics of the structural model, the task manager may generate a task specifying one or more tasks or action, such as acquiring additional data related to the target object. For example, if the task manager determines that acquired data of a location on the structural model is below a threshold quality level or is otherwise insufficient, the task manager may generate or update a revised task that includes one or more tasks that position the robot to acquire additional data regarding the location.

Sensor data may be used to generate, maintain, and update the digital representation, including modeling of defects. The sensors used to collect the sensor data may vary between robotic machines. Example of sensors include, but are not limited to, cameras or visual sensors capable of imaging in one or more of visible, low-light, ultraviolet, and or infrared (i.e., thermal) contexts, thermistors or other temperature sensors, material and electrical sensors, pressure sensors, acoustic sensors, radiation sensors or imagers, probes that apply non-destructive testing technology, and so forth. With respect to probes, for example, the robotic machine may contact or interact physically with the target object to acquire data.

The environment's digital representation may incorporate or be updated based on a combination of factors derived from the data of one or more sensors on the robotic machine (or integral to the target object itself). Acquired sensor data may be subjected to a feature extraction algorithm. In some implementations, relatively faster processing can be achieved by performing feature extraction on data obtained by RGB or infrared cameras. In some implementations, scale-invariant feature transform (SIFT) and speeded up robust features (SURF) techniques may provide additional information on descriptors—for example, Oriented FAST and rotated BRIEF (ORB) feature extraction can be performed. In other implementations, simple color, edge, corner, and plane features can be extracted.

The task manager may receive visual image data from imaging sensors (e.g., cameras, lidar) on the robotic machines to create or update a 3D model of the target object to localize defects on the 3D model. Based on the sensor data, as incorporated into the 3D model, the task manager may detect a defect, such as a crack, a region of corrosion, or missing part, of the target object. For example, the task manager may detect a crack on a location of a vehicle based on visual image data that includes color and/or depth information indicative of the crack. The 3D model may additionally be used as a basis for modeling other layers of information related to the target object. Further, the task manager may determine risk associated with a potential or imminent defect based on the digital representation. Depending on the risk and a severity of the defect, the task manager, as described above, may send signal(s) to the robotic machines indicating instructions to repair or otherwise address a present or pending defect.

In some embodiments, to repair, remediate, or otherwise prevent a defect, the task manager may create a 3D model of a part or component pieces of the part of the target object needed for the repair. The task manager may generate descriptions of printable parts or part components (i.e., parts suitable for generation using additive manufacturing techniques) that may be used by a 3D printer (or other additive manufacturing apparatus) to generate the part or part components. Based on the generated instructions or descriptions, the 3D printer may create the 3D printed part to be attached to or integrated with the target object as part of a repair process. Further, one or more robotic machines may be used to repair the target object with the 3D printed part(s). While a 3D printed part is described in this example, other repair or remediation approaches may also be employed. For example, in other embodiments, the task manager may send signal(s) indicating instructions to a controller of a robotic machine to control the robotic machine to spray a part of the target object (e.g., with a lubricant or spray paint) or to replace a part of the target object from an available inventory of parts. Similarly, in some embodiments, a robotic machine may include a welding apparatus that may be autonomously employed to perform an instructed repair. In some embodiments, the task manager may send signal(s) to a display to indicate to an operator to enable the operator to repair the defect using one or more implements of the robotic machines.

Accurate position control and navigation of an unmanned aerial vehicle (UAV) in GPS denied environments, such as indoors, is challenging as alternatives are to rely on inertial sensors or other sources such as vision. Inertial sensing is prone to drifts and biases, while alternative techniques such as vision-based are computationally intensive. This invention proposes a system of one or more laser beam transmitters, one or more reflectors, and quad detectors (or cameras) mounted on gimbals on the drone. The laser transmitter through the reflector transmits a laser beam in any desired direction. For any desired height of the drone, exact position in space could be specified using the spherical angles at which the laser beam is transmitted. The drone, upon achieving the way-point is then stabilized by a controller that locks the laser beam to the quad detector. Due to positioning or navigational errors, if the drone does not achieve detection of the laser beam in the expected amount of time, the laser beam is raster scanned till the quad detector achieves detection. Upon the initial laser lock, the laser beam angle is shifted within specified maximum angular rate such that given commanded height, the drone can navigate while maintaining laser lock. This is achieved by a controller that tries to minimize the offset of laser beam impact point on the detector and the detector center or a pre-specified radius around the detector center. If laser lock is lost during guidance, then either the laser beam could be moved to the previous position where lock was achieved, while keeping the drone in hover mode or the drone could navigate based on inertial sensing to the current way point specified by laser beam angle and commanded height, or a combination of the two. In order to achieve this feedback, quad detector measurements could be provided to the laser transmitter/mirror controller.

With regard to robotic machine positioning and stabilization, the pose estimate of the robotic machine camera can be used to localize an object or region within the field of view of the camera through trigonometric transforms. This setup can be used to localize artifacts on, for example, walls, trees, buildings, etc. during inspection for offline analysis or for providing the next way point for the robotic machine to make a closer inspection. In one embodiment, a laser transmitting unit(s) mounted on a first robotic machine interacts with a detector mounted on the second robotic machine. The laser transmitter includes a laser source, which may be incident on a mirror mounted on a motor-controlled stage. Motors may be used to actuate the mirror, and to give pan and tilt flexibility. The flexibility allows for the steering or pointing of the laser. A detector mounted on the second robotic machine may have one or more detection units. The detection unit may include a focusing lens to better direct the laser beam and increase a field of view. The second robotic machine may start its travel, e.g., flight, from a position where the detector sees the incident laser light. With an initial lock of the detector onto the laser light, the motors connected to the mirror actuate as required to steer the laser toward a region of interest. Using this knowledge and applying geometric transformations, the pan and tilt angles may be converted to positional feedback to the second robotic machine, where the robotic machine's control unit then reacts accordingly such that the laser beam is kept at the center of the detector. Height and/or distance information may be collected from an altitude measurement sensor (affixed to the second robotic machine). Such z-dimensional information may aid in 3D movement.

In one embodiment, multiple lasers and detectors may be used to increase the accuracy of the system and navigation. The second robotic machine may be controlled by the first robotic machine even if an obstacle occludes individual beams from reaching the detector. For situations where there is a requirement to see around corners, multiple robotic machines can be deployed, and an intermediate robotic machine may act as a repeater. The intermediate robotic machine may be deployed with a beam splitter+detector installed. The beam splitter may reflect half of the incident light on to the second robotic machine and its detector. The remaining half of the light may reach a detector present on the intermediate robotic machine. Using the same laser-locking strategy, the position of the intermediate robotic machine may be known.

The imaging sensor of the second robotic machine may be used for both navigation/localization as well as for inspection purposes. Further, the laser may be used for both navigation/localization as well as for line-of-sight data transmission.

Although embodiments of the subject matter are described herein with respect to mobile the equipment and vehicles, particularly rail cars, trains, locomotives, and other rail vehicles, embodiments of the inventive subject matter are also applicable for use with the equipment generally. In addition to stationary equipment, other vehicles are included, such as mining vehicles, agricultural vehicles, and other off-highway vehicles (e.g., vehicles that are not designed or permitted to travel on public roadways), automotive or passenger vehicles, aircraft (manned and unmanned), marine vessels, and/or freight transportation vehicles (e.g., semi-tractor/trailers and over-the-road trucks). The term 'consist' refers to two or more robotic machines or items of mobile equipment that are mechanically or logically coupled to each other. By logically coupled, the plural items of mobile equipment are controlled so that controls to move one of the items causes a responsive movement (e.g., a corresponding movement) in the other items in consist, such as by wireless command.

In an embodiment, a system includes a first robotic machine having a first set of capabilities for interacting with a target object, a second robotic machine having a second set of capabilities for interacting with the target object, and a task manager. The task manager has one or more processors and is configured to determine capability requirements to perform a task on the target object; the task has an associated series of sub-tasks, with the sub-tasks having one or more capability requirements. The task manager is also configured to assign a first sequence of sub-tasks to the first robotic machine for performance by the first robotic machine based at least in part on the first set of capabilities and a second sequence of sub-tasks to the second robotic machine for performance by the second robotic machine based at least in part on the second set of capabilities. The first and second robotic machines are configured to coordinate performance of the first sequence of sub-tasks by the first robotic machine with performance of the second sequence of sub-tasks by the second robotic machine, and thereby to accomplish the task.

In another embodiment, the first and second sets of capabilities of the first and second robotic machines each include at least one of flying, driving, diving, lifting, imaging, grasping, rotating, tilting, extending, retracting, pushing, and/or pulling.

In another embodiment, the second set of capabilities of the second robotic machine include at least one capability that differs from the first set of capabilities of the first robotic machine.

In another embodiment, the first and second robotic machines coordinate performance of the first sequence of sub-tasks by the first robotic machine with the performance of the second sequence of sub-tasks by the second robotic machine by communicating directly with each other.

In another embodiment, the first robotic machine notifies the second robotic machine, directly or indirectly, that one of the corresponding sub-tasks is complete and the second robotic machine is responsive to the notification by performing a corresponding sub-task in the second sequence.

In another embodiment, the first robotic machine provides to the second robotic machine, directly or indirectly, a sensor signal having information about the target object, and the task manager makes a decision whether the second robotic machine proceeds with a sub-task of the second sequence based at least in part on the sensor signal.

In another embodiment, at least some of the sub-tasks are sequential such that the second robotic machine begins performance of a dependent sub-task in the second sequence responsive to receiving a notification from the first robotic machine that the first robotic machine has completed a specific sub-task in the first sequence.

In another embodiment, the first robotic machine performs at least one of the sub-tasks in the first sequence concurrently with performance of at least one of the sub-tasks in the second sequence by the second robotic machine.

In another embodiment, the task manager is configured to access a database that stores capability descriptions corresponding to each robotic machine in a group of robotic machines, and the task manager is further configured to select the first and second robotic machines to perform the task instead of other robotic machines in the group based on a suitability of the capability descriptions of the first and second robotic machines relative to capability needs ascribed in the database to the task or corresponding sub-tasks.

In another embodiment, the first robotic machine performs one or more of the first sequence of sub-tasks by coupling to and lifting the second robotic machine from a starting location to a lifted location such that the second robotic machine in the lifted location is positioned relative to the target object to complete one or more of the second sequence of sub-tasks than if the second robotic machine is in the starting location.

In another embodiment, the first robotic machine performs the first sequence of sub-tasks by flying, and the first robotic machine identifies the target object and determines at least two of: a position of the target object, a position of the first robotic machine, and a position of the second robotic machine, and the second robotic machine performs the second sequence of sub-tasks by one or more of modifying the target object, manipulating the target object, observing the target object, interacting with the target object, and releasing the target object.

In another embodiment, the first robotic machine, having been assigned a sequence of sub-tasks by the task manager: determines to travel a determined path from a first location to a second location, or determines to act using a capability of the first set of capabilities, or both determines to travel the intended path and determines to act using the capability, and signals to the second robotic machine, to the task manager, or both the second robotic machine and the task manager information including at least one of the determined path, the act of using the capability, or both.

In another embodiment, the second robotic machine, responsive to the signal from the first robotic machine, initiates a confirmatory receipt signal back to the first robotic machine.

In another embodiment, the first robotic machine and the second robotic machine each are configured to generate one or more of: time indexing signals associated one or both of the first sequence of sub-tasks and the second sequence of sub-tasks, position indexing signals for locations of one or both of the first robotic machine and the second robotic machine, and orientation indexing signals for one or more tools configured to implement one or both of the first set of capabilities of the first robotic machine and the second set of capabilities of the second robotic machine.

In another embodiment, at least one of the first robotic machine and/or the second robotic machine has a first mode of operation that is a fast, gross movement mode and a second mode of operation that is a slow, fine movement mode.

In another embodiment, the system further includes one or more of a stabilizer, an outrigger, and/or a clamp, and a transition in operation from the first mode to the second mode comprises deploying and setting the stabilizer, outrigger, or clamp.

In another embodiment, the first mode of operation includes moving at least one of the first robotic machine and the second robotic machine to a determined location relative to the target object. The second mode of operation includes actuating one or more tools of at least one of the first robotic machine and the second robotic machine accomplish the task or a sub-task.

In an embodiment, a system includes a first robotic machine and a second robotic machine. The first robotic machine has a first set of capabilities for interacting with a surrounding environment. The first robotic machine is configured to receive a first sequence of sub-tasks related to the first set of capabilities of the first robotic machine. The second robotic machine has a second set of capabilities for interacting with the surrounding environment. The second robotic machine is configured to receive a second sequence of sub-tasks related to the second set of capabilities of the second robotic machine. The first and second robotic machines are configured to perform the first and second sequences of sub-tasks, respectively, to accomplish a task that involves at least one of manipulating or inspecting a target object that is distinct from the first and second robotic machines. The first and second robotic machines are configured to coordinate performance of the first sequence of sub-tasks by the first robotic machine with performance of the second sequence of sub-tasks by the second robotic machine.

In another embodiment, at least some of the sub-tasks are sequential such that the second robotic machine begins performance of a corresponding sub-task in the second sequence responsive to receiving a notification from the first robotic machine that the first robotic machine has completed a specific sub-task in the first sequence.

Another embodiment relates to a method for controlling a first robotic machine and a second robotic machine. The first robotic machine has a first set of capabilities for interacting with a surrounding environment. The first robotic machine is configured to receive a first sequence of sub-tasks related to the first set of capabilities of the first robotic machine. The second robotic machine has a second set of capabilities for interacting with the surrounding environment. The second robotic machine is configured to receive a second sequence of sub-tasks related to the second set of capabilities of the second robotic machine. The method includes performing the first and second sequences of sub-tasks to accomplish a task comprising at least one of manipulating or inspecting a target object, and coordinating performance of the first sequence of sub-tasks by the first robotic machine with performance of the second sequence of sub-tasks by the second robotic machine.

The above description is illustrative and not restrictive. For example, the above-described embodiments (and/or aspects thereof) may be used in combination with each other. In addition, modifications may be made to adapt a situation or material to the teachings of the inventive subject matter without departing from its scope. While the dimensions and types of materials described herein are intended to define the parameters of the inventive subject matter, they are not limiting and are example embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general-purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings. As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle control system comprising:
   a first robotic machine having a first set of capabilities for interacting with a target object on board a vehicle or a consist that includes the vehicle;
   a second robotic machine having a second set of capabilities for interacting with the target object; and
   a task manager having one or more processors and that is configured to determine capability requirements to perform a task on the target object, the task having an associated series of sub-tasks, with the sub-tasks having one or more capability requirements,
   the task manager being configured to assign a first sequence of sub-tasks to the first robotic machine for performance by the first robotic machine based at least in part on the first set of capabilities and a second sequence of sub-tasks to the second robotic machine for performance by the second robotic machine based at least in part on the second set of capabilities,
   wherein the first robotic machine is configured to provide to the second robotic machine, directly or indirectly, a sensor signal having information about the target object, to coordinate performance of the first sequence of sub-tasks by the first robotic machine with performance of the second sequence of sub-tasks by the second robotic machine,
   wherein the first robotic machine is configured to perform one or more of the first sequence of sub-tasks by moving the second robotic machine from a first location to a second location such that the second robotic machine in the second location is positioned relative to the target object to complete one or more of the second sequence of sub-tasks than if the second robotic machine is in the first location,
   wherein the first robotic machine is configured to identify the target object and determine at least two of: a position of the target object, a position of the first robotic machine, and/or a position of the second robotic machine, and
   wherein the second robotic machine is configured to perform one or more of the second sequence of sub-tasks by manipulating the target object.

2. The vehicle control system of claim 1, wherein the first and second sets of capabilities of the first and second robotic machines each include at least one of flying, driving, diving, lifting, imaging, grasping, rotating, tilting, extending, retracting, pushing, or pulling.

3. The vehicle control system of claim 1, wherein the second set of capabilities of the second robotic machine includes at least one capability that differs from the first set of capabilities of the first robotic machine.

4. The vehicle control system of claim 1, wherein the first and second robotic machines coordinate performance of the first sequence of sub-tasks by the first robotic machine with the performance of the second sequence of sub-tasks by the second robotic machine by communicating directly with each other.

5. The vehicle control system of claim 1, wherein the first robotic machine notifies the second robotic machine, directly or indirectly, that one of the corresponding sub-tasks is complete and the second robotic machine is responsive to the notification by performing a corresponding sub-task in the second sequence.

6. The vehicle control system of claim 1, wherein the task manager is configured to make a decision whether the second robotic machine proceeds with a sub-task of the second sequence based at least in part on the sensor signal.

7. The vehicle control system of claim 1, wherein at least some of the sub-tasks are sequential such that the second robotic machine begins performance of a dependent sub-task in the second sequence responsive to receiving a notification from the first robotic machine that the first robotic machine has completed a specific sub-task in the first sequence.

8. The vehicle control system of claim 1, wherein the first robotic machine performs at least one of the sub-tasks in the first sequence concurrently with performance of at least one of the sub-tasks in the second sequence by the second robotic machine.

9. The vehicle control system of claim 1, wherein the task manager is configured to access a database that stores capability descriptions corresponding to each robotic machine in a group of robotic machines, and the task manager is further configured to select the first and second robotic machines to perform the task instead of other robotic machines in the group based on a suitability of the capability descriptions of the first and second robotic machines relative to capability needs ascribed in the database to the task or corresponding sub-tasks.

10. The vehicle control system of claim 1, wherein the first robotic machine performs one or more of the first sequence of sub-tasks by flying.

11. The vehicle control system of claim 1, wherein the first robotic machine, having been assigned a sequence of sub-tasks by the task manager:
   determines to travel a determined path from a first location to a second location, or determines to act using a capability of the first set of capabilities, or both determines to travel the intended path and determines to act using the capability, and signals to the second robotic machine, to the task manager, or both the second robotic machine and the task manager information including at least one of the determined path, the act of using the capability, or both.

12. The vehicle control system of claim 11, wherein the second robotic machine, responsive to the signal from the first robotic machine, initiates a confirmatory receipt signal back to the first robotic machine.

13. The vehicle control system of claim 1, wherein the first robotic machine and the second robotic machine each are configured to generate one or more of:

time indexing signals associated one or both of the first sequence of sub-tasks or the second sequence of sub-tasks, position indexing signals for locations of one or both of the first robotic machine or the second robotic machine, or orientation indexing signals for one or more tools configured to implement one or both of the first set of capabilities of the first robotic machine or the second set of capabilities of the second robotic machine.

14. The vehicle control system of claim 1, wherein at least one of the first robotic machine or the second robotic machine has a first mode of operation that is a fast, gross movement mode and a second mode of operation that is a slow, fine movement mode.

15. The vehicle control system of claim 14, further comprising one or more of a stabilizer, an outrigger, or a clamp, and wherein a transition in operation from the first mode to the second mode comprises deploying and setting said one or more of the stabilizer, the outrigger, or the clamp.

16. The vehicle control system of claim 14, wherein the first mode of operation comprises moving at least one of the first robotic machine or the second robotic machine to a determined location relative to the target object; and the second mode of operation comprises actuating one or more tools of at least one of the first robotic machine or the second robotic machine to accomplish the task or a sub-task.

17. A vehicle control system comprising:

a first robotic machine having a first set of capabilities for interacting with a surrounding environment associated with a vehicle or a consist that includes the vehicle, the first robotic machine being configured to receive a first sequence of sub-tasks related to the first set of capabilities of the first robotic machine; and a second robotic machine having a second set of capabilities for interacting with the surrounding environment, the second robotic machine being configured to receive a second sequence of sub-tasks related to the second set of capabilities of the second robotic machine, wherein the first and second robotic machines are configured to perform the first and second sequences of sub-tasks, respectively, to accomplish a task that involves at least one of manipulating or inspecting a target object that is distinct from the first and second robotic machines, the target object being onboard the vehicle or the consist that includes the vehicle, the first and second robotic machines being configured to coordinate performance of the first sequence of sub-tasks by the first robotic machine with performance of the second sequence of sub-tasks by the second robotic machine, wherein the first robotic machine is configured to provide to the second robotic machine, directly or indirectly, a sensor signal having information about the target object, wherein the first robotic machine is configured to perform one or more of the first sequence of sub-tasks by moving the second robotic machine from a first location to a second location such that the second robotic machine in the second location is positioned relative to the target object to complete one or more of the second sequence of sub-tasks than if the second robotic machine is in the first location, wherein the first robotic machine is configured to identify the target object and determine at least two of: a position of the target object, a position of the first robotic machine, and/or a position of the second robotic machine, and wherein the second robotic machine is configured to perform one or more of the second sequence of sub-tasks by manipulating the target object.

18. The vehicle control system of claim 17, wherein at least some of the sub-tasks are sequential such that the second robotic machine begins performance of a corresponding sub-task in the second sequence responsive to receiving a notification from the first robotic machine that the first robotic machine has completed a specific sub-task in the first sequence.

19. A vehicle control method for a first robotic machine having a first set of capabilities for interacting with a surrounding environment associated with a vehicle or a consist that includes the vehicle, the first robotic machine being configured to receive a first sequence of sub-tasks related to the first set of capabilities of the first robotic machine, and a second robotic machine having a second set of capabilities for interacting with the surrounding environment, the second robotic machine being configured to receive a second sequence of sub-tasks related to the second set of capabilities of the second robotic machine, the method comprising:

performing the first and second sequences of sub-tasks to accomplish a task comprising at least one of manipulating or inspecting a target object onboard the vehicle or the consist that includes the vehicle; and with at least one processor, coordinating performance of the first sequence of sub-tasks by the first robotic machine with performance of the second sequence of sub-tasks by the second robotic machine, wherein the first robotic machine provides to the second robotic machine, directly or indirectly, a sensor signal having information about the target object, wherein the first robotic machine performs one or more of the first sequence of sub-tasks by moving the second robotic machine from a first location to a second location such that the second robotic machine in the second location is positioned relative to the target object to complete one or more of the second sequence of sub-tasks than if the second robotic machine is in the first location, wherein the first robotic machine identifies the target object and determine at least two of: a position of the target object, a position of the first robotic machine, and/or a position of the second robotic machine, and wherein the second robotic machine performs one or more of the second sequence of sub-tasks by manipulating the target object.

* * * * *